(12) United States Patent
Hierro Domenech et al.

(10) Patent No.: US 12,552,120 B2
(45) Date of Patent: Feb. 17, 2026

(54) PERSONALIZING FOOT SUPPORTS

(71) Applicant: Peridot Print LLC, Palo Alto, CA (US)

(72) Inventors: Lluis Hierro Domenech, Sant Cugat del Valles (ES); Davinia Font Calafell, Sant Cugat del Valles (ES); Cristina Dominguez Manchado, Sant Cugat del Valles (ES); Jordi Casellas López, Sant Cugat del Valles (ES); Bernat Poll Crespo, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 880 days.

(21) Appl. No.: 17/373,403

(22) Filed: Jul. 12, 2021

(65) Prior Publication Data

US 2023/0011550 A1 Jan. 12, 2023

(51) Int. Cl.
| | |
|---|---|
| B29D 35/12 | (2010.01) |
| A43B 7/142 | (2022.01) |
| A43B 7/149 | (2022.01) |
| A43B 17/00 | (2006.01) |
| G06F 30/20 | (2020.01) |
| B33Y 80/00 | (2015.01) |

(52) U.S. Cl.
CPC .............. *B29D 35/12* (2013.01); *A43B 7/142* (2013.01); *A43B 7/149* (2013.01); *A43B 17/00* (2013.01); *G06F 30/20* (2020.01); *B33Y 80/00* (2014.12)

(58) Field of Classification Search
CPC ......... A43B 7/142; A43B 7/149; A43B 17/00; B33Y 80/00
See application file for complete search history.

(56) References Cited

U.S. PATENT DOCUMENTS

| | | | |
|---|---|---|---|
| 4,674,201 A | 6/1987 | Weiss | |
| 4,813,159 A | 3/1989 | Weiss | |
| 6,141,889 A * | 11/2000 | Baum | A43B 13/223 36/43 |
| 2004/0194344 A1 | 10/2004 | Tadin | |
| 2008/0072455 A1* | 3/2008 | Svae | A61F 5/019 36/88 |
| 2017/0164688 A1 | 6/2017 | Weiss | |
| 2019/0082779 A1* | 3/2019 | Miller | A43B 13/386 |

* cited by examiner

*Primary Examiner* — Rehana Perveen
*Assistant Examiner* — Cuong V Luu
(74) *Attorney, Agent, or Firm* — Michael Dryja

(57) ABSTRACT

In an example, a method is described. The method comprises generating object model data representative of a design of a foot support to be produced for a subject according to the object model data. The design of the foot support comprises: a support portion; and an extension portion extending from the support portion. A type of the extension portion is based on a condition of the subject's foot and the extension portion is personalized to the subject based on at least one measurement of the subject's foot.

20 Claims, 15 Drawing Sheets

PERSONALIZING FOOT SUPPORTS

BACKGROUND

Improper footwear may exacerbate or lead to certain foot issues. Certain foot issues may cause discomfort and/or be associated with gait disorders. In addition, foot issues may be associated with other health issues such as back pain. Custom-made footwear or orthotic inserts may be used to correct certain foot issues.

BRIEF DESCRIPTION OF DRAWINGS

Non-limiting examples will now be described with reference to the accompanying drawings, in which.

DETAILED DESCRIPTION

Manufacturing Techniques

Figure 1:
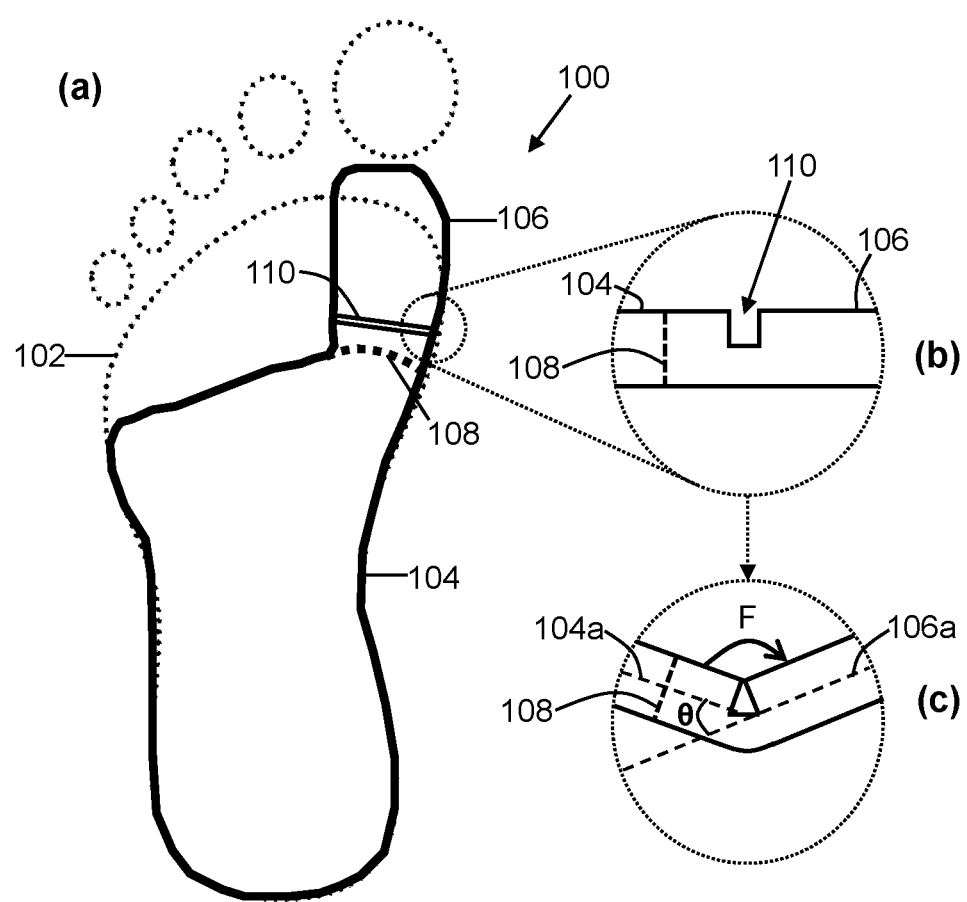
FIG. 1 is a schematic illustration of an example foot support.

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used. An example additive manufacturing technique may be referred to as three-dimensional printing (3DP).

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibers that may, for example, have been cut into short lengths from long strands or threads of material. Build material may be deposited, for example on a print bed and processed layer by layer, for example within a fabrication chamber. According to some examples, suitable build materials may include, for example, polyamides (e.g., PA11, PA12), thermoplastic polyurethane (TPU), thermoplastic polyamide (TPA) or polypropylene.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black. In one example such a fusing agent may comprise any or any combination of an infra-red light absorber, a near infra-red light absorber, a visible light absorber and a UV light absorber. Examples of visible light enhancers include dye based colored ink and pigment based colored ink.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce or prevent coalescence by, for example, cooling the build material or through some other mechanism. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

Other example manufacturing techniques, which may not fall under the 'additive manufacturing' definition, include molding (e.g., injection molding, extrusion molding, compression molding, blow molding, etc.), thermoforming, machining, etc.

Foot Supports

Certain examples herein describe foot supports and methods, machine-readable media and/or apparatus associated with designing and/or producing such foot supports using manufacturing techniques such as described above.

FIG. 1 shows a schematic illustration of an example foot support 100 for a subject's foot (where a contact profile of the underside of the subject's foot is represented by dotted line 102). Different views (a), (b) and (c) of the foot support 100 are shown.

View (a) shows one side (e.g., an 'upper side') of the foot support 100 and depicts a perimeter of the foot support 100 in relation to the contact profile of the foot. The 'upper side' of the foot support 100 directly faces an underside of the subject's foot (although may not be in direct contact with the underside if there are other components such as foam or fabric between the foot support 100 and the subject's foot).

View (b) is an expanded view of part of an edge (e.g., showing the 'depth' or 'thickness') of the foot support 100 when the foot support 100 is in an unflexed state (i.e., without application of a bending force such as when the foot support 100 is not in use or when the foot is flat on the ground during in one phase of the subject's gait).

View (c) corresponds to the portion shown view (b) but shows the foot support 100 in a flexed state (with application of a bending force such as may occur in another phase of the subject's gait such as 'push-off').

In some examples, the foot support 100 is a shell for a foot orthotic insert (not shown) such that the foot support 100 may provide structural support for at least part of the foot in conjunction with other components (e.g., foam layers, etc.) of the foot orthotic insert. These other components may be combined with the foot support 100 as part of a manufacturing process (e.g., by using an adhesive or other technique for assembling the orthotic insert using the foot support 100 and the other components).

The foot support 100 comprises a support portion 104 and an extension portion 106 extending from the support portion 104. The extension portion 106 is integral with the support portion 104. For example, the support portion 104 and the extension portion 106 may be a single-part or 'unitary' component for a foot orthotic insert such as may be manufactured using an additive manufacturing technique or another appropriate technique such as described above.

In some examples, the foot support 100 may be formed using a material such as PA12, as described above, and/or other materials such as PA11 and PA12 GB (i.e., PA12 with Glass Bits/Beads). Other example materials that could be used for the foot support 100 include thermoplastic polyurethane (TPU), thermoplastic polyamide (TPA) or polypropylene, etc. However, the choice of material may be based on appropriateness for the application, i.e., use in the foot support 100 with the flexibility/rigidity properties as described herein. The level of support (e.g., defined by structural rigidity) provided by the foot support 100 may be adjusted by using a different material or a combination of different materials in the foot support 100 and/or by modifying at least one dimension (e.g., thickness) in at least one location of the foot support 100.

The support portion 104 may provide support for the foot between the heel and the metatarsophalangeal joints (MPJs) of the subject's foot. For example, the support portion 104 may provide support for the heel and/or arch of the foot.

Figure 2:
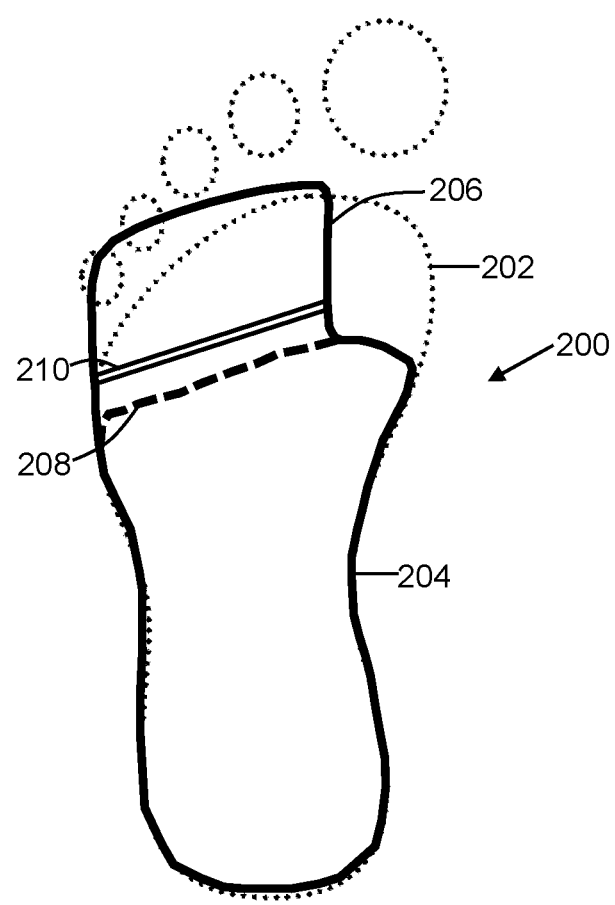
FIG. 2 is a schematic illustration of an example foot support.
Figure 3:
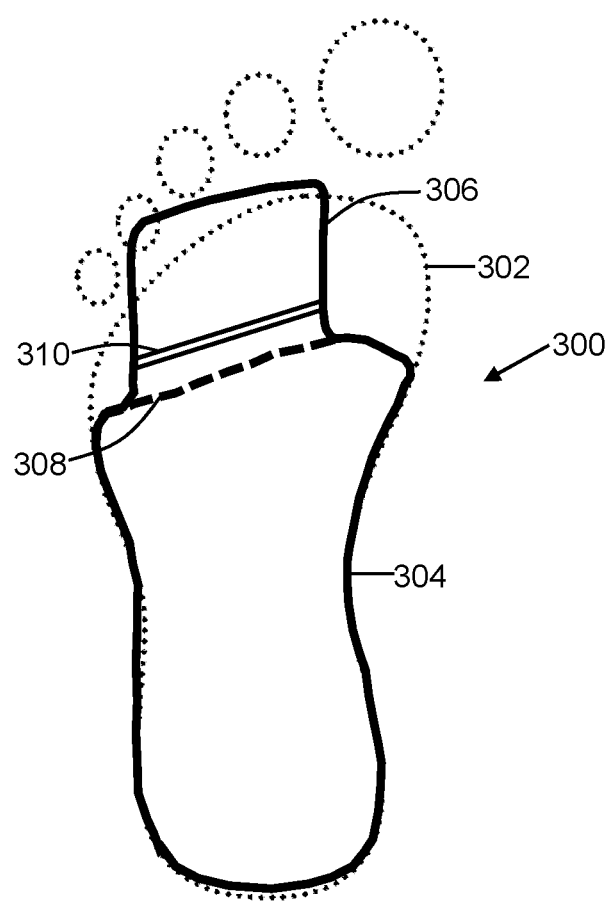
FIG. 3 is a schematic illustration of an example foot support.

The extension portion 106 may provide at least some support for at least one of the metatarsals of the foot (e.g., the extension portion 106 may provide similar functionality to a metatarsal 'pad', which may be used as part of or in conjunction with a foot orthotic insert in the 'forefoot' area). In some examples, the extension portion 106 may comprise a Morton's extension (as depicted by FIG. 1), a reverse Morton's extension (as depicted by FIG. 2) or a partial reverse Morton's extension (as depicted by FIG. 3). In some examples, any number and combination of metatarsals or other parts of the foot may be supported by the extension portion 106 (other than those parts of the foot already supported by the support portion 104).

The extension portion 106 may be used to correct or alleviate certain foot conditions. Examples of foot conditions that may be corrected by the extension portion 106 include 'plantar 2nd metatarsal head symptoms', 'structural hallux limitus', 'hallux rigidus' and/or 'functional hallux limitus', among other foot conditions. Different types of extension portion 106 may be used depending on the subject's foot condition. Various different types of extension portion 106 are described in more detail below.

In this example, the extension portion 106 comprises a Morton's extension (for providing support for the first metatarsal from the first MPJ), which may be used to correct or alleviate 'plantar 2nd metatarsal head symptoms' (e.g., if the extension portion 106 includes relatively a flexible portion as described below) or 'structural hallux limitus' or 'hallux rigidus' (e.g., if the extension portion 106 includes a semi-rigid portion as described below).

The transition between the support portion 104 and the extension portion 106 is represented by a dashed line 108 although this line 108 may not represent a difference in 'structure' of the foot support 100. Thus, the line 108 is added to FIG. 1 to help with visualization of the distinction between the support portion 104 and the extension portion 106.

The foot support 100 further comprises at least one closable opening 110 formed in the foot support 100. In this example, a single closable opening 110 is formed in an upper side of the extension portion 106 and extends all the way between the distal edge and the medial edge (described below) of the extension portion 106 in a straight line. When viewing the edge of the foot support 100 in its unflexed state, the closable opening 110 has a rectangular-shaped 'cut-out' profile in the plane perpendicular to the straight line defined between the distal edge and the medial edge. As highlighted above, there may be multiple techniques to form the closable opening 110 in the foot support 100 such as 3D Printing (e.g., as an example of additive manufacturing), molding or machining the foot support 110 to form a 'cut-out' in the upper side of the extension portion 106. As described below, the cross-sectional profile of the closable opening 110 may be customized to provide the foot support 100 with a specified flexibility/rigidity in region of the foot support 100 comprising the closable opening 110 without affecting the rigidity/flexibility of the rest of the foot support 100. The profile of the closable opening 110 depicted by FIG. 1 is an example and other examples are possible such as having internal facing walls that comprise at least a wall portion that is at an angle (i.e., not parallel as shown by FIG. 1) to the opposite facing wall portion. Other example profiles for the closable opening 110 are described below.

In other examples, as described below, there may be multiple closable openings 110 (formed in the upper side, lower side and/or both the upper side and lower sides of the foot support) with various cross-sectional profiles and distributions. The cross-sectional profiles may or may not be the same for each closable opening 110.

Upon flexing of the foot support 100 by application of a bending force, F, between the support portion 104 and the extension portion 106 (such as may occur during the 'push-off' phase of gait during use of the foot support 100), closure of the at least one opening 110 is to prevent further flexing of the foot support 100 beyond a specified angle range.

The specified angle range may refer to the range of angles between which the support portion 104 may flex relative to the extension portion 106. The unflexed state of the foot support 100 in view (b) occurs when there is no bending force, F, applied between the support portion 104 and the extension portion 106. View (c) shows an example angle, θ (theta), of the support portion 104 relative to the extension portion 106 when the foot support 100 is subject to an applied bending force, F. View (b) corresponds to a minimum angle of flex, θ(min) of 0 degrees since the support portion 104 and extension portion 106 are shown as being in the same plane. However, view (c) corresponds to a maximum angle of flex, θ(max) that is greater than 0 degrees since a plane 104a defined by the support portion 104 intersects a plane 106a defined by the extension portion 106 at the angle, θ(max). The support portion 104 and extension portion 106 may not necessarily be 'planar' but may each be generally defined by a plane that is substantially parallel to the sides (i.e., the upper side and lower side) of the support portion 104 and extension portion 106.

In some examples, the specified angle range may refer to the angle difference between a maximum-permitted 'dorsiflexion' position and a neutral position of the foot (i.e., where the foot is flat on the surface/floor during the gait). In some examples, the foot support 100 may be flexed to accommodate movement of the subject's foot to the 'plantar flexion' position of the foot. Thus, while the 'specified angle range' refers to the angle difference between the neutral position (corresponding to θ(min)) and the dorsiflexion position (corresponding to θ(max)), the foot support 100 may be designed to accommodate the full range of motion that happens during the various phases of gait, including the plantar flexion position (which could be represented by the foot support 100 being flexed to a negative angle, θ, based on the geometry depicted by FIG. 1).

The range of angles, θ (theta), within which the support portion 104 is permitted to flex relative to the extension portion 106 may depend on the type of extension portion 106, which may be based on the foot condition the extension portion 106 is to correct or alleviate. For example, certain conditions may be corrected or alleviated by a specified maximum 'dorsiflexion' position for the foot where the foot support 100 may be designed to permit flexing of the foot up to a maximum dorsiflexion position for the condition (i.e., where the foot support 100 may be in a flexible state) and prevent further flexion of the foot beyond the maximum dorsiflexion position (i.e., where the foot support may be in a relatively rigid state compared with the flexible state).

As shown by view (c), the closable opening 110 'closes' when the support portion 104 is flexed to a maximum angle, θ(max), relative to the extension portion 106. At the point of closure, opposing internal faces of the closable opening 110 at least partially contact (e.g., 'abut') each other and may, to a certain extent, prevent further flexing of the support portion 104 beyond the maximum angle, θ(max). At or near to this point of closure, the flexibility of the foot support 100 may change. For example, for angles less than the maximum angle, θ(max), the foot support 100 may be relatively flexible. However, for angles equal to or greater than the maximum angle, θ(max), the foot support 100 may be relatively rigid.

Thus, in some examples, the foot support 100 may be provided in different rigidity (or flexibility) states depending on the angle between the support portion 104 and the extension portion 106. In other words, while the closable opening 110 is open (as shown by view (b)), the foot support 100 may be relatively flexible. However, when the closable opening 110 is closed (as shown by view (c)), the foot support 100 may be relatively rigid (e.g., to resist further flexing beyond the maximum angle). This may be referred to as a semi-rigid state where at some angles (e.g., between θ(min) and θ(max)) the foot support 100 is flexible and at other angles (e.g., at or above θ(max)) the foot support is rigid.

The angle range between which the support portion 104 may flex (between the relatively flexible state as shown by view (b) and the relatively more rigid state as shown by view (c)) may be referred to as the 'specified angle range'.

One example way of defining the angle (referred to herein as θ (theta)) corresponding to the dorsiflexion position is to refer to the angle formed between the surface (e.g., the ground) upon which the foot is supported and the bottom of the foot (i.e., substantially corresponding to the area of the foot supported by the support portion 104). This angle substantially corresponds to the angle, θ (theta), depicted by FIG. 1 because the foot support 100 may flex to this angle, θ (theta), to allow the subject's foot to move to the dorsiflexion position during their gait.

Another example way of defining the angle (referred to herein as φ (phi)) corresponding to the dorsiflexion position is to refer to the angle formed between a first plane (comprising an origin of a radius of curvature of the bottom of the foot) that is parallel to the surface (e.g., the ground) upon which the foot is supported and a second plane intersecting the same origin as well as the ankle.

Figure 6:
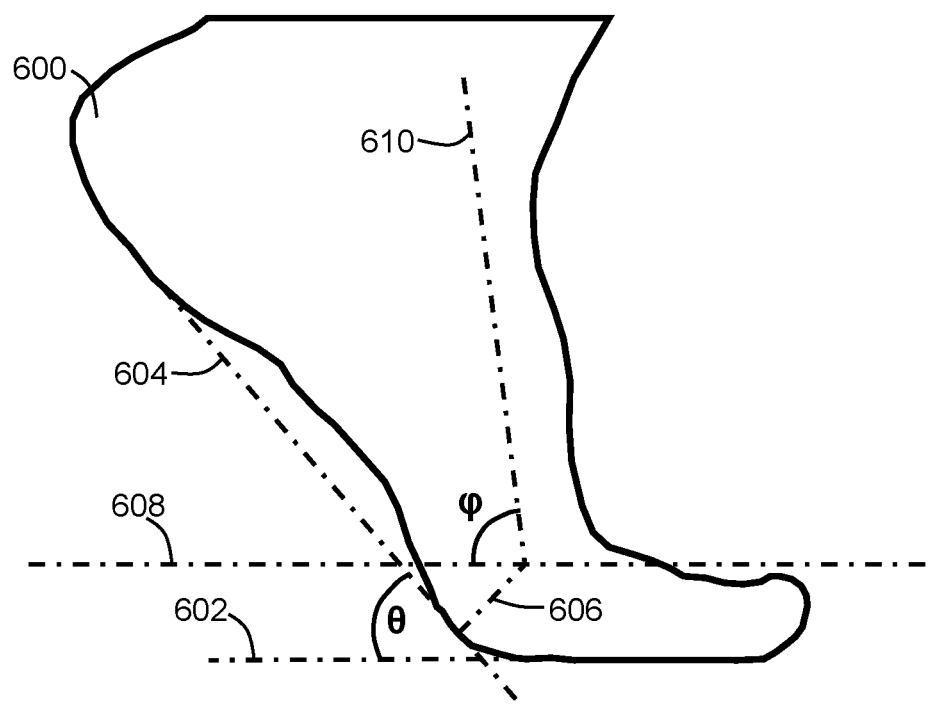
FIG. 6 depicts a geometry of a subject's foot during the 'push-off' phase of gait.

Both example ways of defining the angle are depicted in FIG. 6, described in more detail below. There may be a fixed relationship between the two angles, θ (theta) and φ (phi), based on the geometry of the subject's foot, which is also depicted in FIG. 6.

The following examples of angles (in relation to the 'specified angle range') refer to the angle, θ (theta). However, these angle examples may be appropriately modified based on the fixed relationship mentioned above and discussed in more detail in relation to FIG. 6.

In examples where the specified angle range refers to the angle difference between a maximum-permitted 'dorsiflexion' angle (corresponding to θ(max)) and a neutral position of the foot, the 'specified angle range' may be any angle between 10 degrees (e.g., θ(min)=0 degrees for the neutral position to θ(max)=10 degrees for the dorsiflexion position) and 30 degrees (e.g., θ(min)=0 degrees for the neutral position to θ(max)=30 degrees for the dorsiflexion position). In one example, the maximum angle θ(max) of the specified angle range is 15 degrees. In another example, the maximum angle θ(max) of the specified angle range is 20 degrees. These examples of specified angles ranges may refer to a 'semi-rigid' foot support 100 design with relatively restricted flexibility until the foot support 100 becomes rigid beyond the specified angle range.

However, the specified angle range may be any angle between 40 degrees (e.g., θ(min)=0 degrees for the neutral position and θ(max)=40 degrees for the dorsiflexion position) and 60 degrees (e.g., θ(min)=0 degrees for the neutral position and θ(max)=60 degrees for the dorsiflexion position) for a relatively 'flexible' foot support 100 design. In one example, θ(max) for the 'flexible' foot support 100 may be at least 55 degrees or another value within the range described above (note that, in some examples relating to the 'flexible' foot support 100, the angle θ(max) may not be a maximum value but a minimum value to which the foot support 100 is permitted to flex to suit the subject's needs).

Other specified angle ranges between the neutral position and the dorsiflexion angle may be specified within any angle range described above, or above or below such angle ranges, depending on the subject's individual needs.

As noted above, the foot support 100 may permit at least some flexing of the foot for the full range of motion during the subject's gait. Thus, the foot support 100 may still be flexed to accommodate the plantar flexion position, if needed. However, the foot support 100 may be designed to accommodate the specified angle range, which may be based on what is appropriate for the subject. For example, the maximum angle in the specified angle range may refer to the angle at which the subject's starts to feel discomfort or pain (e.g., due to excessive flexing in their foot) so that the foot support 100 may be designed to prevent flexing beyond this maximum (dorsiflexion) angle. The design of the foot support 100 and the design in accordance with the other examples described herein may allow the range of motion to be personalized to the subject e.g., based on the angle of flex where the subject starts to feel discomfort or pain.

Therefore, the above angle ranges may be customized according to the needs of the subject so the examples are to be taken as a guide.

Parts of the foot support 100 may be designed to be rigid, semi-rigid and/or flexible, depending on the foot condition the foot support 100 is to correct or alleviate. For example, the foot support 100 may be flexible and/or semi-rigid in the part of foot support 100 proximal to the at least one closable opening 110 (e.g., within part of the extension portion 106 itself) and may be rigid elsewhere in the foot support 100 (e.g., in the parts of the foot support 100 without any closable openings 110 such as in the support portion 104 or in another part of the extension portion 106).

Certain examples described herein (including foot support 100 and other examples below) may provide additional possibilities for correction or alleviation of certain foot conditions.

For example, the foot support 100 may be customized to have a specified flexibility, semi-rigidity or rigidity property (or a hybrid property based on any combination of any number of these properties) to correct or alleviate certain foot conditions. This level of customization may provide additional possibilities in terms of the number of foot conditions that may be corrected or alleviated. Customization of the property may lead to improved results for the subject e.g., in terms of decreased time to correct the foot condition and/or a pleasing outcome for the subject through use of the foot support 100 since the foot support 100 may be appropriately designed for correcting or alleviating the subject's foot condition. A clinician such as a podiatrist may be able design (or facilitate the design of) a foot support 100 that may be a close match to the subject's needs/prescription in an integral/unitary piece design, which may be readily integrated with other components of a foot orthotic insert. The design of the foot support 100 may be such that the specified flexibility, semi-rigidity or rigidity property is provided in the region of the closable opening 110 (i.e., where the foot bends) and a different degree of rigidity/flexibility is provided elsewhere in the foot support 100. For example, the foot support 100 may be substantially rigid apart from in the region of the closable opening 110, where is may be more flexible than the rest of the foot support 100.

Further, by providing the foot support 100 (including the extension portion 106) as an integral/unitary piece design, the overall manufacturing process may be simplified and/or may be performed with reduced cost e.g., due to fewer parts being needed for a foot orthotic insert. Certain manufacturing techniques (such as 3D Printing) may be highly accurate and/or repeatable, which may lead to a consistent outcome (e.g., with improved throughput and/or cost control) for a manufacturer of the foot support 100.

Further examples of different types of foot supports (with different types of extension portions and/or different designs for the part of the foot support comprising the at least one closable opening) are described below.

FIG. 2 shows a schematic illustration of an example foot support 200 for a subject's foot (where a contact profile of the underside of the subject's foot is represented by dotted line 202). Reference signs for features of foot support 200 that are similar or correspond to features of foot support 100 are incremented by 100 compared with FIG. 1.

Similar to FIG. 1, the foot support 200 comprises a support portion 204 and an extension portion 206, which are distinct from each other by the imaginary line 208. At least one closable opening 210 is provided in the extension portion 206.

In this example, the extension portion 206 comprises a reverse Morton's extension (for providing support for the second to fifth metatarsals from the second to fifth MPJs, respectively), which may be used to correct or alleviate 'functional hallux limitus' (e.g., if the extension portion 106 includes a relatively flexible portion).

FIG. 3 shows a schematic illustration of an example foot support 300 for a subject's foot (where a contact profile of the underside of the subject's foot is represented by dotted line 302). Reference signs for features of foot support 300 that are similar or correspond to features of foot support 200 are incremented by 100 compared with FIG. 2.

Similar to FIG. 2, the foot support 300 comprises a support portion 304 and an extension portion 306, which are distinct from each other by the imaginary line 308. At least one closable opening 310 is provided in the extension portion 306.

In this example, the extension portion 306 comprises a 'partial' reverse Morton's extension (for providing support for the second to fourth metatarsals from the second to fourth MPJs, respectively), which may be used to correct or alleviate 'functional hallux limitus' or other conditions where support is not needed for the fifth metatarsal (e.g., if the extension portion 106 includes a relatively flexible portion).

In other examples, a different combination of metatarsals may be supported by the 'partial' extension portion 306. For example, the 'partial' extension portion 306 may provide support to one, two, three or four metatarsals from their respective MPJs such as: (1) extending from the second, third, fourth or fifth MPJ (i.e., for one-metatarsal support), (2) extending from the second-to-third, third-to-fourth or fourth-to-fifth MPJs (i.e., for two-metatarsal support), (3) extending from the second-to-fourth MPJs (as depicted by FIG. 3) or third-to-fifth MPJs (i.e., for three-metatarsal support), or (4) extending from the first-to-fourth MPJs (i.e., for four-metatarsal support). One-metatarsal support is also provided according to the example of FIG. 1. Four-metatarsal support is also provided according to the example of FIG. 2. In some examples, more than one extension portion 306 (e.g., two or more extension portions 106, 206, 306 to provide support for any number or combination of metatarsals) may be provided (e.g., if individual metatarsals or combinations of metatarsals need support).

As can be recognized from FIGS. 1, 2 and 3, there are different possible types of extension portion 106, 206, 306, which can be customized to the foot condition. The degree of rigidity (or flexibility) provided in the foot support 100, 200, 300 (e.g., within the extension portion 106, 206, 306) may depend on the foot condition to be corrected or alleviated. As will be described in more detail below, various different structural features (e.g., at least one closable opening 110, 210, 310) may be provided in the foot support 100, 200, 300 to facilitate correction or alleviation of a variety of foot conditions.

Figure 4:
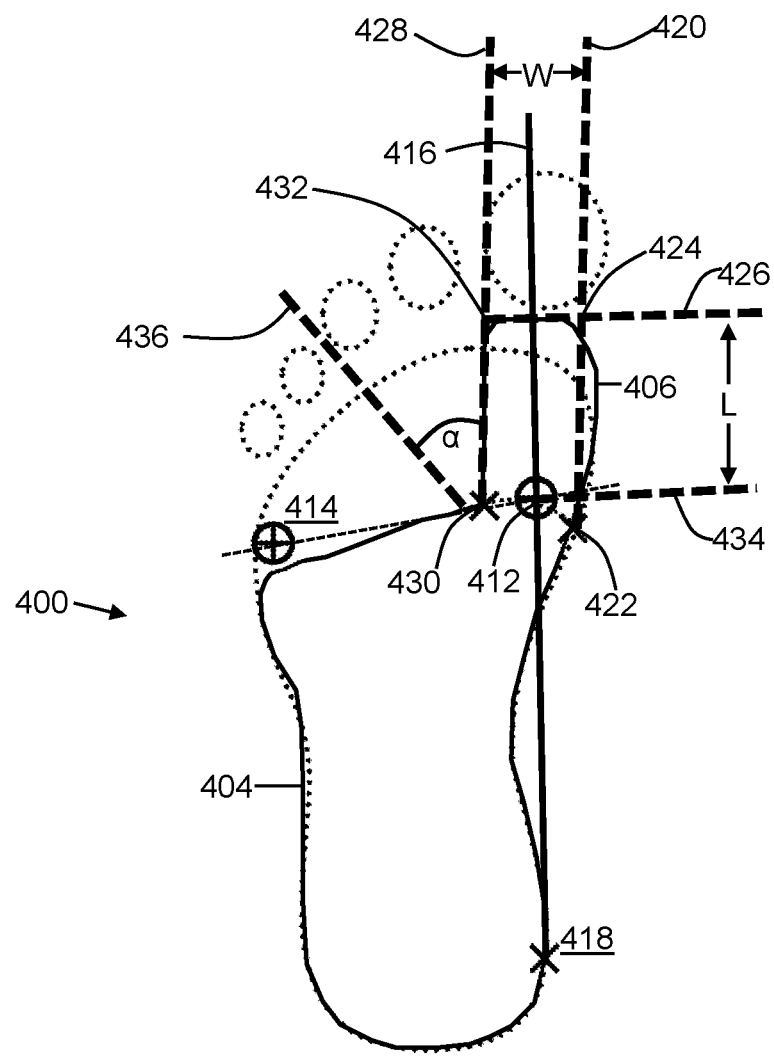
FIG. 4 is a schematic illustration of a map of anatomical features with respect to an example foot support.

FIG. 4 shows a map of certain anatomical features of the foot with respect to a foot support 400 corresponding to the foot support 100 of FIG. 1. The map includes references to certain geometrical points and lines of reference to assist with defining certain features of certain foot supports described herein (e.g., foot support 100). Reference signs for features of foot support 400 that correspond to features of foot support 100 are incremented by 300 compared with FIG. 1. Certain features are not labelled for ease of illustration since the foot support 400 corresponds to foot support 100.

The location of the first MPJ 412 is marked on the map and defines the part of the foot from which the extension portion 406 (i.e., the Morton's extension) extends from the support portion 404. For reference, the location of the fifth MPJ 414 is also marked on the map. A 'medial projected line' 416 is defined, which passes through the locations of the first MPJ 412 and the medial heel point 418 (where the 'medial' side of the foot corresponds to the view of the 'inside' of the foot between the feet such that the 'medial heel point' 418 corresponds to the part of the heel that is closest to the adjacent foot when the feet are side-by-side). A (fixed) medial edge, represented by line 420, of the extension portion 406 passes through a medial point 422 of the support portion 404 (at the imaginary line where the extension portion 406 becomes distinct from the support portion 404) and a medial point 424 of the extension portion 406 (intersecting a distal edge 426 of the extension portion 406). The distal edge 426 defines the edge of the extension portion 406 that is furthest away from the support portion 404. A 'lateral' side of the foot is the other side of the foot to the medial side (i.e., the lateral side corresponds to the view of the 'outside' of the foot). A (mobile) lateral edge, represented by line 428, of the extension portion 406 is substantially parallel to the medial edge 420 and extends through a lateral point 430 of the support portion 404 (at the line where the extension portion 406 becomes distinct from the support portion 404) and a lateral point 432 of the extension portion 406 (which intersects the distal edge 426). A further line 434 is parallel to the distal edge 426 and intersects the location of the first MPJ 412. In some examples, it is possible to angle the extension portion 406 (to be aligned with the line 436) with respect to the support portion 404 by a certain angle, a (alpha), to accommodate certain needs of the subject e.g., deformations and/or bunions. The angle may be positive or negative with respect to the geometry shown by FIG. 4.

The width, 'W', of the extension portion 406 is defined by the distance between the medial edge 420 and the lateral edge 428. The length, of the extension portion 406 is defined by the distance between the distal edge 426 and the line 434.

Figure 5:
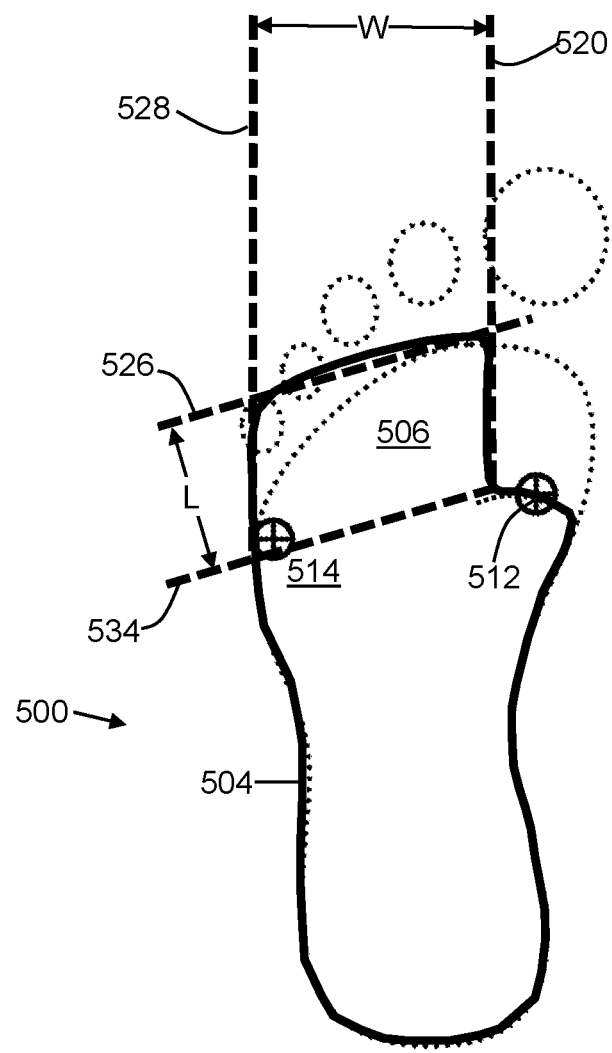
FIG. 5 is a schematic illustration of a map of anatomical features with respect to an example foot support.

FIG. 5 shows a map of certain anatomical features of the foot with respect to a foot support 500 corresponding to the foot support 200 of FIG. 2. The map includes references to certain geometrical points and lines of reference to assist with defining certain features of certain foot supports described herein (e.g., foot support 200 and/or foot support 300). Reference signs for features of foot support 500 that correspond to features of foot support 200 are incremented by 300 compared with FIG. 2. Certain features are not labelled for ease of illustration since the foot support 500 corresponds to foot support 200 although the geometrical points and lines of reference are also relevant to the foot support 300. Reference is therefore also made to the map of FIG. 4 and reference signs for features of the map in FIG. 4 are incremented by 100 compared with FIG. 4. A description is not given for all features of the map in FIG. 5 where these are similar to or correspond to features of the map in FIG. 4.

The locations of the first MPJ 512 and fifth MPJ 514 are marked on the map. The extension portion 506 comprises a reverse Morton's extension, which extends from the support portion 504 between the second MPJ (not marked) and the fifth MPJ 514. The width, W, of the extension portion 506 is defined between the (mobile) medial edge, represented by line 520, of the extension portion 506 and the (fixed) lateral edge, represented by line 528, of the extension portion 506. The length, L, of the extension portion 506 again corresponds to the distance between the distal edge 526 and the line 534.

FIG. 6 shows a geometry of a subject's foot 600 during the 'push-off' phase of gait and refers to the angles, θ (theta) and φ (phi) described above. The foot 600 is in its 'dorsiflexion' position such that the foot 600 is provided at the 'dorsiflexion' angle, θ(max), which is defined as the angle between the surface 602 upon which the foot 600 is supported and the bottom plane 604 of the foot 600 during the push-off phase of gait. The angle, θ (theta), shown in FIG. 6 may substantially correspond to the angle, θ (theta), formed by the foot support 100 in FIG. 1 (i.e., the foot support 100 may flex to the maximum angle, θ(max), to permit the foot 600 to be in its dorsiflexion position). Other examples described herein refer to foot supports which may be flexed to the angle, θ(max) during the 'push-off' phase of gait although some examples may restrict the angle range between which the foot support may flex before becoming rigid to prevent further flexing. A turning radius 606, which is perpendicular to the bottom plane 604, defines a radius of curvature of the bottom of the foot 600. The origin of the turning radius 606 intersects a plane 608 parallel to the surface 602. A plane 610 that intersects the ankle and the origin of the turning radius 606 defines the angle, φ (phi), with the plane 608. The angle θ (theta) relates to the angle that is formed between a foot support 100, 200, 300, 400, 500 and the surface 602 at the dorsiflexion position. The angle, φ (phi), relates to the angle that is formed between the plane 608 of the foot 600 itself (rather than the foot support or bottom plane of the foot 600) and is therefore related to the angle θ (theta) based on the geometry of the foot 600 shown in FIG. 6.

In the example angle ranges given above, the 'specified angle range' is defined based on the angle, θ (theta).

However, in some examples, the specified angle range may be defined based on the angle, φ (phi). For example, some clinicians may specify the 'dorsiflexion' position based on φ (phi), which is related to the angle, θ (theta), described herein. However, whichever angle is used (θ (theta) or φ (phi)), the specified angle range may be selected appropriately to permit an appropriate range of motion during gait. An example estimate of the relationship between θ (theta) and φ (phi) is θ (theta)=φ (phi) minus 30 degrees (although this is an estimate and may vary by e.g., 5 degrees either way, or by a smaller or greater margin).

Thus, in the example case that a maximum permitted dorsiflexion angle is φ (phi)=85 degrees for a 'flexible' foot support, the angle θ (theta) is 85−30=55 degrees (or between the range θ (theta)=50 to 60 degrees for the example margin).

In examples relating to the 'flexible' foot support, the angle θ (theta) may be at least 55 degrees (or another value above or below 55 degrees) (i.e., the example angle (theta) =55 degrees may refer to the actual range of motion by which the foot support may flex through use but the 'flexible' design may still be permitted to flex beyond this angle even if this does not happen through use).

In the example case that a maximum permitted dorsiflexion angle is φ (phi)=45 degrees for a 'semi-rigid' foot support, the angle θ (theta) is 15 degrees (or between 10 and 20 degrees for the example margin). In examples relating to the 'semi-rigid' foot support, the angle θ (theta) may refer to a maximum flex angle (in contrast to the 'flexible' foot support example given above).

Figure 7:
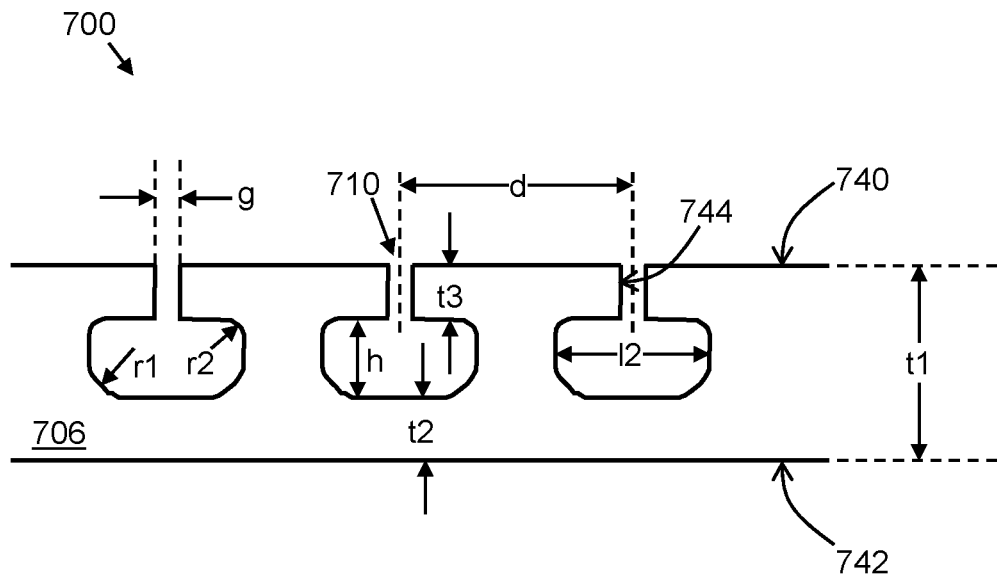
FIG. 7 shows a schematic illustration of an example design of part of an example foot support.

FIG. 7 shows a schematic illustration of an example design for a closable opening 710 of a foot support 700, when viewing the medial or lateral edge of the foot support 700 in its unflexed state. Reference signs for features of foot support 700 that are similar or correspond to features of foot support 100 are incremented by 600 compared with FIG. 1. In this example, a plurality of closable openings 710 are provided in an upper side 740 (and each closable opening 710 extends all the way between the medial and lateral edge) of the extension portion 706 of the foot support 700. Reference is also made to FIGS. 4 and 5, which refer to certain geometrical points and lines of reference to assist with defining certain features of the closable opening 710.

The 'upper side' 740 refers to the side of the foot support 700 directly facing the underside of the subject's foot (although the upper side 740 may not necessarily be in contact with the underside of the subject's foot). The opposite side of the foot support 700 is the 'lower side' 742 and directly faces the surface (e.g., the ground, the upper surface of the shoe midsole or outsole) upon which the subject is supported (although the lower side 742 may not necessarily be in direct contact with the surface).

The closable openings 710 collectively permit the foot support 700 to flex to an angle, θ (theta). As shown by view (c) of FIG. 1, a closable opening 110 prevents further flexing of the foot support 100 when internal faces of the closable opening 110 at least partially abut each other to create a substantially rigid structure that resists further flexing beyond a certain angle. A similar principle applies to the foot support 700, which permits a certain amount of flexing before becoming rigid at a certain angle when the internal faces 744 of the closable openings 710 at least partially abut each other upon the foot support 700 being flexed in a similar way to that shown by view (c) of FIG. 1.

The design of the closable openings 710 may be customized based on at least one 'design parameter' for the foot support. The design parameter may specify at least one parameter such as a type of extension portion 706, at least one geometric value of the closable opening 710 and/or a material type to use for the foot support 700. The design parameter(s) may be varied to control the rigidity/flexibility in different regions of the foot support 700.

Thus, in some examples, the design parameter(s) of the foot support 700 is selected (e.g., automatically based on received data or manually by a clinician) to specify a type of extension portion 706 to correct a condition of a subject's foot. In some examples, the type of extension portion 706 may refer to a Morton's extension portion, reverse Morton's extension portion or partial reverse Morton's extension portion. In some examples, the type of extension portion 706 may further refer to whether the extension portion 706 is to be flexible, rigid and/or semi-rigid (e.g., depending on the foot condition to be corrected or alleviated).

In FIG. 7, the design parameters comprise: the total thickness, t1, (or depth) of the extension portion 706; a number of closable openings 710 (three in this example although other numbers are possible such as one, two or more than three); the distribution of the closable openings 710 (e.g., each adjacent closable opening 710 is separated by a distance, d); the size of the gap, g, formed in the upper side 740 between the opposing faces 744 of the closable opening 710; the height, h, of an enlarged part (e.g., a 'chamber-like' part) of the closable opening 710; the length, l2, of the enlarged part; a first radius of curvature, r1, at a lower corner of the enlarged part; a second radius of curvature, r2, at an upper corner of the enlarged part; a second thickness, t2, between a lower surface of the enlarged part and the lower side 742; and/or a third thickness, t3, between an upper surface of the enlarged part and the upper side 740. It is to be appreciated that these values may change upon the foot support 700 being flexed from its neutral state.

In some examples, the design parameter(s) may be determined based on design guidelines, trial and error and/or a finite element method (and/or another appropriate method), which may model the flexibility (or rigidity) of the extension portion 706 according to the applied bending force (which may be estimated for the subject's foot) within input dimensions and material type. By way of example, design guidelines (e.g., based on historical/expert analysis) may specify at least one appropriate design parameter (e.g., an example geometry which may have approximately the correct flexibility/rigidity characteristics), which can be fine-tuned to the subject's needs by trial and error and/or the finite element method.

Some example guidelines for the design of the closable openings 710 in the foot support 700 are as follows: t1=2.5 to 4 mm (e.g., variable thickness across the extension portion 706), t2=t3=0.8 mm, r1=0.5 mm, r2=0.25 mm, g=0.3 mm, l2=4 mm and h=1 mm. These example values are to provide guidance and other values may be used depending on material type and/or number/distribution of the closable openings 710.

The design of the closable openings 710 may permit a certain degree of downward flexibility (e.g., to allow the subject's foot to flex to the 'plantar flexion' position) and a certain degree of upward flexibility (e.g., to allow the foot to flex to the 'dorsiflexion' position). However, due to the relatively proximity of the opposing faces 744, the amount of upward flexibility may be restricted such that the extension portion 706 becomes relatively more rigid when the opposing faces 744 at least partially abut each other.

A foot support 700 incorporating the design of the closable openings 710 may therefore be used to correct certain foot conditions such as 'structural hallux limitus' or 'hallux rigidus' where the extension portion 706 is provided as a Morton's extension. It may also be possible to specify the same or a similar design of the closable openings 710 for an extension portion 706 provided as a reverse Morton's extension and/or a partial reverse Morton's extension.

Thus, in some examples, the at least one design parameter is to specify at least one dimension of the at least one closable opening 710 without application of the bending force (e.g., when the foot support 700 is in its unflexed state).

In some examples, the at least one dimension is specified according to the specified angle range between which the foot support 700 is to flex in response to application of the bending force. For example, a larger specified angle range may be possible if the gap, g, is increased, if the thickness t1 is made smaller, if the distance, d, is decreased and/or if a different material is used for the foot support 700, and vice versa. Any appropriate variation of the at least one design parameter may be specified to control the flexibility/rigidity characteristics of the foot support 700.

In some examples, the at least one dimension comprises a first dimension (e.g., a dimension corresponding to 'd', 'g' and/or 'l2' in FIG. 7) in a first direction defined between the support portion (not shown in FIG. 7 but shown in e.g., FIGS. 1 to 5) and a distal end (not shown in FIG. 7 but shown in e.g., FIGS. 4 to 5) of the extension portion 706. The first direction may be parallel or substantially parallel to the medial projected line 416 shown in FIG. 4.

In some examples, the at least one dimension comprises a second dimension (e.g., a dimension corresponding to width 'w' shown in FIGS. 4 and 5) in a second direction defined between a medial edge and lateral edge (also shown in FIGS. 4 and 5) of the foot support 700.

In some examples, the at least one dimension comprises a third dimension (e.g., a dimension corresponding to 't1', t2', 't3' and/or 'h') in a third direction between the upper side 740 and lower side 742.

It is to be appreciated that at least one of these dimension values may change upon the foot support 700 being flexed from its neutral state.

In some examples, the first dimension (e.g., 'l2') varies as a function of position in the third direction such that the first dimension (i.e., dimension 'g') at a surface of the upper side 740 (and/or lower side 742 in examples with at least one closable opening 710 in the lower side 710) is smaller than a maximum size of the first dimension (i.e., dimension 'l2') at a different position along the third direction. Such examples refer to closable openings 710 as shown in FIG. 7 where there is a chamber-like part of opening 710 within the body of the foot support 700 with the opening 710 extending to an upper side 740 or lower side 742 with a smaller dimension in the first direction at the surface compared with the maximum dimension within the chamber-like part of the opening 710. In some examples, the chamber-like part may not 'close' in the way that the opposing faces 744 may do when the foot support 700 is flexed.

In some examples, closure of the closable opening 710 in response to application of the bending force causes contact between opposing internal faces 744 (e.g., when the faces 744 may at least partially abut each other) of the closable opening 710 in the first direction, such that contact between the internal faces 744 prevents further flexing of the foot support (e.g., due to the increased rigidity of the foot support 700 upon such contact).

Figure 8:
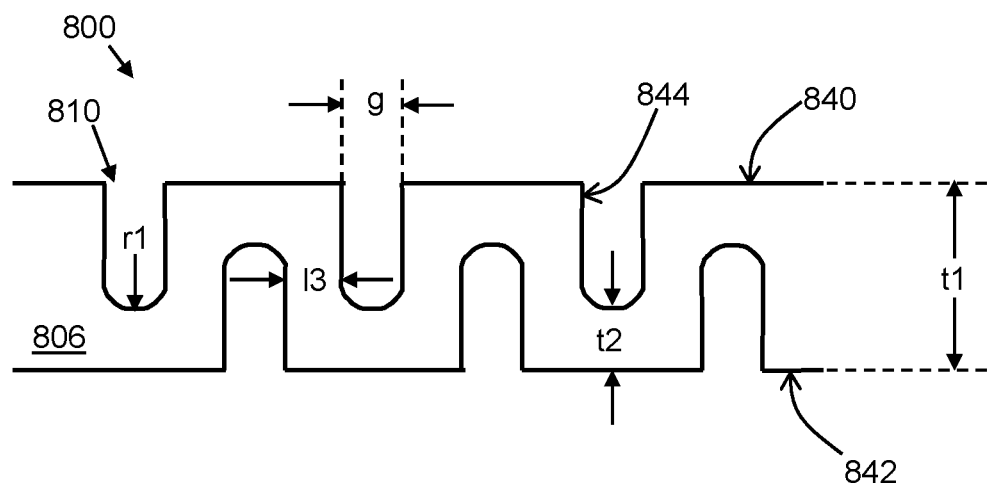
FIG. 8 shows a schematic illustration of an example design of part of an example foot support.

FIG. 8 shows a schematic illustration of an example design for a closable opening 810 of a foot support 800, when viewing the medial or lateral edge of the foot support 800 in its unflexed state. Reference signs for features of foot support 800 that are similar or correspond to features of foot support 100 are incremented by 700 compared with FIG. 1. In this example, a plurality of closable openings 810 are provided in both the upper side 840 and lower side 842 (and each closable opening 810 extends all the way between the medial and lateral edge) of the extension portion 806 of the foot support 800. Reference is also made to FIGS. 4 and 5, which refer to certain geometrical points and lines of reference to assist with defining certain features of the closable opening 810.

Similar principles may apply to the design process for the closable openings 810 of FIG. 8 as for the closable openings 710 of FIG. 7. For example, different design parameters may be specified.

In some examples, at least one design parameter is to specify that there is to be at least one closable opening in both the upper side 840 and the lower side 842 of the foot support 800. In use of the foot support 800, the upper side 840 of the foot support 800 is oriented to face (directly) towards an underside of a subject's foot and the lower side 842 of the foot support 800 is oriented to face (directly) towards a surface upon which the subject is supported.

In some examples, the at least one closable opening 810 in both the upper side 840 and lower side 842 is to permit flexing of the foot support 800 within a specified angle range that is larger than the specified angle range associated with the foot support 700 of FIG. 7, which comprises at least one closable opening 710 in its upper side 740. It can be seen from FIGS. 7 and 8 that the design of the closable openings 710, 810 are different. However, the number and/or distribution of the closable openings 810 of FIG. 8 are such that a greater degree of flexibility may be achieved with the design of FIG. 8, compared with that of FIG. 7 (subject to the dimensions selected). Accordingly, the design of FIG. 8 may be used to correct or alleviate certain foot conditions such as 'plantar 2nd metatarsal head symptoms' (e.g., in conjunction with a Morton's extension) and/or 'functional hallux limitus' (e.g., in conjunction with a reverse Morton's extension). Other foot conditions may be corrected or alleviated by any combination of the design of the closable opening 810 of FIG. 8 with any appropriate type of extension portion 806.

As already noted, the example of FIG. 8 has a different closable opening 810 design to the design depicted by FIG. 7. In this example, the closable opening 810 has parallel opposing faces 844 separated by a dimension, 'g', in the first direction. The closable opening 810 extends from the upper side 840 into the body of the extension portion 806 such that the bottom, internal, surface of the closable opening 810 is a dimension, t2, in the third direction from the lower side 842 (and vice versa for closable openings 810 in the lower side 842). The bottom, internal, surface of the closable opening 810 is curved with a radius of curvature, r1. The overall thickness of the extension portion 806 is defined by the thickness, t1, in the third direction. The distance (in the first direction) between the nearest internal surfaces 844 of adjacent closable openings 810 through the body of the extension portion 806 is the dimension, l3.

Some example guidelines for the design of the closable openings 810 in the foot support 800 are as follows: t1=2.5 to 4 mm (e.g., variable thickness across the extension portion 806), t2=0.8 mm, r1=0.4 mm, g=0.8 mm and l3=0.8 mm. These example values are to provide guidance and other values may be used depending on material type and/or number/distribution of the closable openings 810.

By providing at least one closable opening 110, 210, 310, 710, 810 in the foot support 100, 200, 300, 700, 800, a specified degree of flexibility/rigidity/semi-rigidity may be provided in the foot support 100, 200, 300, 700, 800 in the region when bending of the foot support 100, 200, 300, 700, 800 may occur during the 'push-off' phase of gait.

In some examples, at least one design parameter may be varied to vary the flexibility/rigidity characteristics. The example designs of the at least one closable openings 110, 710, 810 depicted by FIGS. 1, 7 and 8 may be varied according to the foot condition. In addition, any type of extension portion 106, 206, 306 may be used according to the foot condition. In some examples, there may be no closable openings 810 (e.g., to provide a rigid design). In some examples, at least one dimension of any part of the foot support 100, 200, 300, 400, 500, 700, 800 may be varied (e.g., in addition to or instead of varying the dimension(s) of the at least one opening 110, 210, 310, 710, 810).

Examples described herein may provide specified functionality based on the foot condition that is to be corrected or alleviated. The functionality provided by the at least one closable opening 110, 210, 310, 710, 810 may be similar to or correspond to an (integrated) 'hinge' or 'joint' as an integral part of the foot support 100, 200, 300, 400, 500, 700, 800. This hinge-like functionality may, in some examples, provide different structural properties (e.g., rigidity) depending on the bending angle.

For example, in the phase of the gait where the foot is flat on the ground, certain examples of extension portion 106, 206, 306, 406, 506, 706, 806 may provide a high degree (e.g., full flexibility) due to the relatively low thickness (t2) of the bottom zone (i.e., towards the lower side 742, 842) of the 'hinge' shown in FIGS. 7 and 8.

In some examples, this flexibility parameter may be adjusted by modifying the thickness, t2 (and/or at least one other design parameter such as described above).

In some examples, once the dorsiflexion angle reaches a certain 'threshold' value, the gaps ('g') at the top zone (towards the upper side 740, 840) of the 'hinge' may become at least partially closed such that no more bending is allowed. In this scenario, the extension portion 106, 206, 306, 406, 506, 706, 806 may behave like a rigid Morton's extension. The maximum dorsiflexion value may be adjusted by increasing the gap 'g' and/or the number of closable openings 710, 810 (and/or by varying any appropriate design parameter).

In some examples, other possibilities include varying the overall thickness 't1' to vary the flexibility/rigidity and/or varying the bending radius (e.g., see FIG. 6) by increasing or decreasing the dimensions 'd' or 'l3' between closable openings 710, 810.

As already noted, certain manufacturing techniques may facilitate designs such as provided by the examples described herein. For example, foot supports 100, 200, 300, 400, 500, 700, 800 may be produced by additive manufacturing. The range of design possibilities made available with techniques such as additive manufacturing may facilitate production of multiple different types of extension portions with a large range of possibilities for providing flexibility, rigidity and/or semi-rigidity in at least part of the foot support 100, 200, 300, 400, 500, 700, 800 based on tuning at least one design parameter.

Figure 9:
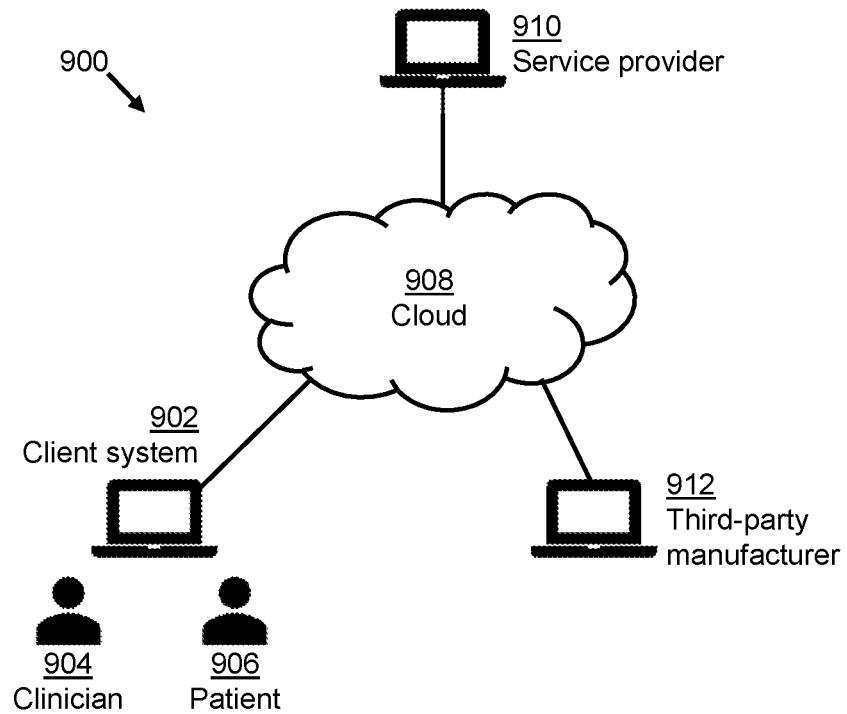
FIG. 9 depicts an example ecosystem in which foot supports according to the examples described herein may be designed and manufactured.

FIG. 9 depicts an example ecosystem 900 in which foot supports according to the examples described herein may be designed and manufactured. According to the ecosystem 900, a client system 902 (e.g., operated by a clinician 904 and/or a patient 906 (i.e., a 'subject')) provides an indication of the subject's foot condition and/or at least one measurement of the subject's 902 foot. This indication may be sent via the cloud 908 and/or directly to a server (not shown) accessible to a service provider 910. The service provider 910 may design a foot support according to certain examples described herein (e.g., by implementing certain methods or machine-readable media described herein) based on the indicated foot condition and/or the at least one measurement. The resulting design may be sent to the clinician 904, patient 906 and/or a third-party manufacturer 912 for manufacturing the foot support according to the design (e.g., using an additive manufacturing apparatus, as described below, or another manufacturing method such as described above).

Other example ecosystems are possible. In some examples, a service provider 910 may not be involved in the design and/or production of foot supports. For example, the client system 902 may send the design (e.g., a 'digital model', 'object model data', etc.) or instructions (e.g., 'digital model generation instructions', 'object generation instructions', etc., for generating a foot support) directly (e.g., via a direct networked connection) or indirectly (e.g., via the cloud 908) to the third-party manufacturer 912. In an example, digital model generation instructions or object generation instructions may be encoded as a program in the client system 902. In another example, digital model generation instructions or object generation instructions may be encoded as a program in a computer controlled by the third-party manufacturer 912. In other words, any of the entities described in the ecosystem 900 may implement any method, machine-readable medium or apparatus described herein.

Figure 10:
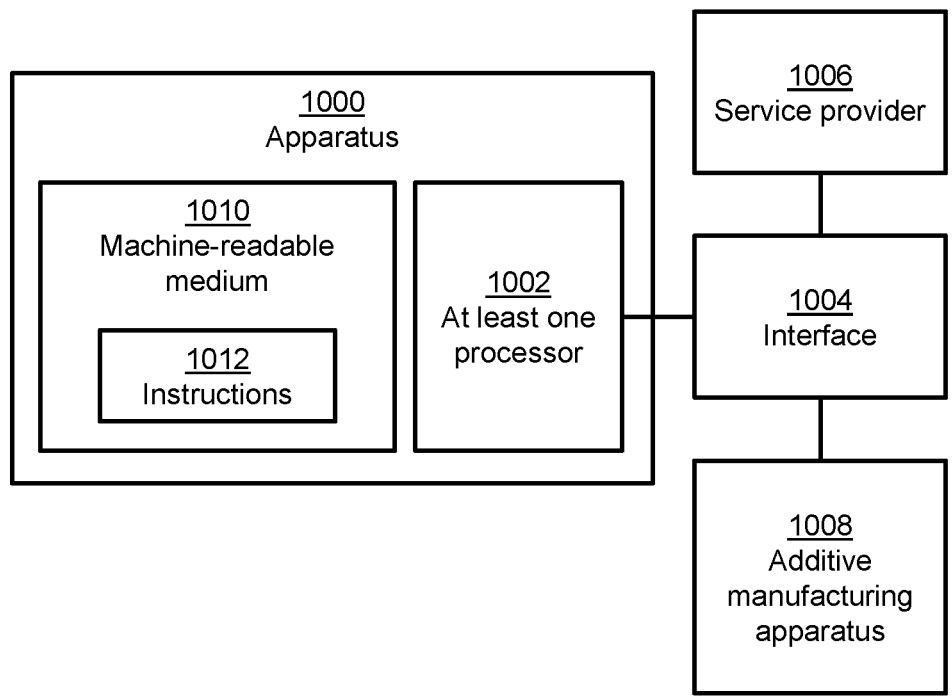
FIG. 10 is a schematic illustration of an example apparatus for implementing or at least partially facilitating certain methods or machine-readable media described herein.

FIG. 10 is a schematic illustration of an example apparatus 1000 for implementing or at least partially facilitating certain methods or machine-readable media described herein. The apparatus 1000 comprises at least one processor 1002 communicatively coupled to an interface 1004 (e.g., implemented by a communication interface) for sending and/or receiving data to/from a service provider 1006 (if present in the ecosystem 900) and/or an additive manufacturing apparatus 1008 (such as a three-dimensional printer) communicatively coupled to the apparatus 1000. As also referred to in relation to FIG. 9, the service provider 1006 may produce a design for a foot support (e.g., a computer-aided design, or the like), which may be received by the interface 1002 e.g., in the form of a CAD file, object model data or another form of data.

The apparatus 1000 further comprises a non-transitory (e.g., 'tangible') machine-readable medium 1010 storing instructions 1012 executable by the at least one processor 1002. The non-transitory machine-readable medium 1010 comprises instructions 1012 to interpret the design received from the service provider 1006 (or directly from the client system 902) and convert the design into a form (e.g., 'print instructions' or 'object generation instructions') that can be recognized by the additive manufacturing apparatus 1008, which may produce the foot support according to the design. For example, the instructions 1012 may cause the at least one processor 1002 to convert object model data representative of the design into print instructions for use by the additive manufacturing apparatus 1008.

The additive manufacturing apparatus 1008 may, in use thereof, produce the object (i.e., the foot support according to the design) in a plurality of layers (which may correspond to respective slices of an object model) according to the print instructions. The additive manufacturing apparatus 1008 may, for example, generate an object in a layer-wise manner by selectively solidifying portions of layers of build material. The selective solidification may, in some examples, be achieved by selectively applying print agents, for example through use of 'inkjet' liquid distribution technologies, and applying energy, for example heat, to the layer. The additive manufacturing apparatus 1008 may comprise additional components not shown herein, for example any or any combination of a fabrication chamber, a print bed, printhead(s) for distributing print agents, a build material distribution system for providing layers of build material, energy sources such as heat lamps and the like.

Figure 11:
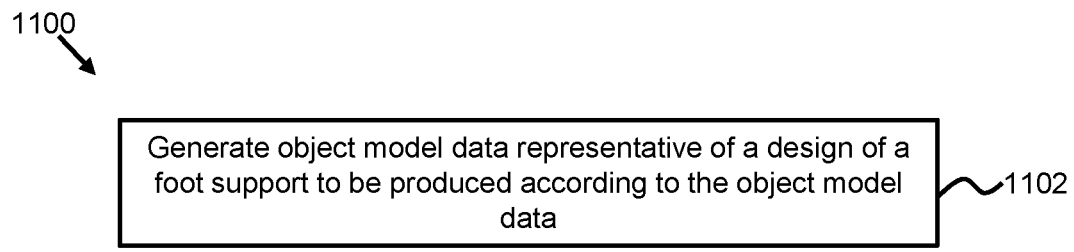
FIG. 11 refers to an example method of generating object model data.

FIG. 11 refers to an example method 1100 of generating object model data such as may be produced by the service provider 910, 1006 of FIGS. 9 and 10 or another entity authorized to produce the object model data (for example, an authorized client system 902 (i.e., the clinician's 904 computer or the patient's 906 computer) or a computer associated with the third-party manufacturer 912) based on the indicated foot condition and/or at least one measurement of the subject's foot. The method 1100 may be implemented by processing circuitry of a user computer, the cloud or a server e.g., controlled by the service provider 910, 1006. For example, the method 1100 may be stored (e.g., in the form of instructions) in a non-transitory (e.g., 'tangible') machine-readable medium for execution of the method 1100 according to the instructions by at least one processor of any of the entities described above.

Reference is made to features of the foot support 100 of FIG. 1 in the method 1100 although the method 1100 may be applicable to the generation of any of the foot supports (e.g., foot supports 200, 300, 400, 500, 700, 800) described herein and certain features and functionality of these foot supports may be referenced in the description of the method 1100.

The method 1100 comprises, at block 1102, generating object model data representative of a design of a foot support 100 to be produced according to the object model data. The design comprises a support portion 104. The design further comprises an extension portion 106 extending from the support portion 104. According to the design, the extension portion 106 is integral with the support portion 104. The design further comprises at least one closable opening 110 formed in the foot support 100.

According to the design, a flexible state of the foot support 100 is defined by a threshold angle of flex permitted by the at least one closable opening 110 in response to application of a bending force between the support portion 104 and the extension portion 106. In addition, a rigid state of the foot support 100 is defined by closure of the at least one closable opening 110 in response to the application of the bending force beyond the threshold angle.

As shown by views (b) and (c) of FIG. 1, the closable opening 110 may permit a degree of flexibility up to a certain angle, θ(max). This degree of flexibility may be referred to as a 'flexible state' of the foot support 100. Upon reaching the angle, θ(max), which may define a maximum angle of flex (or a 'threshold angle' of flex according to the method 1100), further flexing of the foot support 100 may be prevented such that the foot support 100 may become relatively rigid compared with the flexible state. In other words, the foot support 100 may be provided in the 'rigid state' when the flexing of the foot support 100 reaches or exceeds the threshold angle.

The method 1100 may be applicable to the generation of object model data corresponding to the design of any of the foot supports (e.g., foot supports 100, 200, 300, 400, 500, 700, 800 and related examples) according to the various examples described herein.

Figure 12:
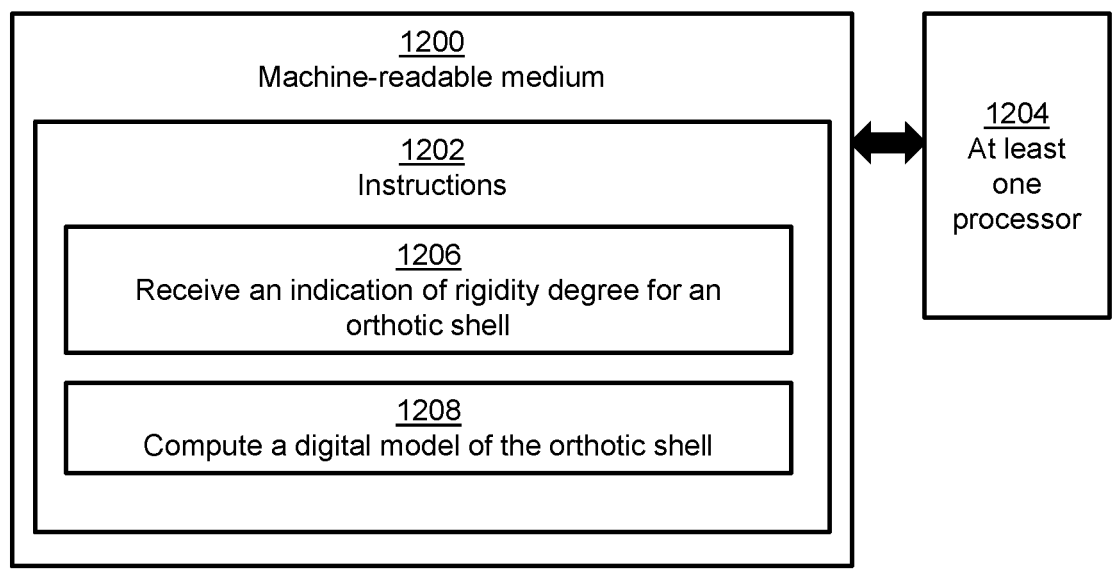
FIG. 12 is a schematic illustration of an example non-transitory machine-readable medium associated with computing a digital model.

FIG. 12 shows an example non-transitory (e.g., 'tangible') machine-readable medium 1200 storing instructions 1202 executable by at least one processor 1204. The non-transitory machine-readable medium 1200 may be implemented by the any of the entities referred to in relation to the method 1100 of FIG. 11.

Reference is made to features of the foot support 100 of FIG. 1 in relation to the non-transitory machine-readable medium 1200 although the non-transitory machine-readable medium 1200 may be applicable to the generation of any of the foot supports (e.g., foot supports 200, 300, 400, 500, 700, 800) described herein and certain features and functionality of these foot supports may be referenced in the description of the non-transitory machine-readable medium 1200.

In this example, the instructions 1202 comprise instructions 1206 to cause the at least one processor 1204 to receive an indication of rigidity degree for an orthotic shell.

The orthotic shell may comprise the foot support of any of the examples described herein. Thus, any reference to the orthotic shell may, in some examples, refer to any of the foot supports described herein. In some examples, the foot support/orthotic shell may be combined with other components to produce a foot orthotic insert as described herein.

The 'rigidity degree' may refer to the relative flexibility or rigidity that is to be provided in the region of the orthotic shell comprising the at least one closable opening. The rest of the orthotic shell may have a different 'rigidity degree' (e.g., the rest of the shell may be more rigid than the region of the shell comprising the at least one closable opening, or vice versa). This rigidity degree may also refer to the circumstances under which the orthotic shell is to be in a flexible state or rigid state, as referred to in the method 1100.

The instructions 1202 further comprise instructions 1208 to cause the at least one processor 1204 to compute a digital model (e.g., a 'design' or 'object model data' as referred to above) of the orthotic shell. The digital model comprises a support portion 104. The digital model further comprises an extension portion 106 integral with the support portion 104. The digital model further comprises at least one closable opening 110 formed in the orthotic shell to permit flexing of the orthotic shell by application of a bending force between the support portion 104 and the extension portion 106. At least one design parameter of the closable opening 110 is specified according to the indicated rigidity degree.

In some examples, the at least one design parameter may refer to any of the design parameters referred to in relation to FIGS. 7 and 8.

Some examples relating to the instructions 1202 are described below.

In some examples, the rigidity degree comprises a selection of at least one of: rigid, semi-rigid and/or flexible (e.g., the foot condition may involve the use of at least one of a rigid, semi-rigid and/or rigid foot support 100, depending on the angle formed when the foot support 100 is flexed). In other words, the foot support 100 may be designed to have at least one of the characteristics, rigid, semi-rigid or rigid, if used for correcting or alleviating a certain foot condition. However, in some examples, the characteristic may vary depending on the angle between the support portion 104 and the extension portion 106. In some examples, a user such as a clinician may provide a 'numerical' rigidity parameter input value rather than a selection from a finite list of rigidity options described above. In other words, in some examples, there may be more than three rigidity degrees for the user to choose from to help with personalization of the foot support 100 according to a patient's needs.

In some examples, the at least one design parameter of the at least one closable opening 110 specifies that at least one closable opening 110 is to be formed in an upper side of the foot support (as in FIG. 7). In some examples, the at least one closable opening 110 is to be formed in both the upper side and a lower side of the foot support 100 (as in FIG. 8). In some examples, there may be no closable openings 110 present (e.g., to provide a relatively rigid foot support 100). In some examples, there may be at least one closable opening 110 in the lower side (but not the upper side) of the foot support 100.

In some examples, a number, type, and/or distribution of the at least one closable opening 110 in the upper side and/or lower side is specified according to the selected rigidity degree. For example, by varying the number, type (e.g., shape/design) and/or distribution of the at least one closable opening 110, the design may be customized to the selected rigidity degree.

In some examples, the type of the at least one closable opening 110 is defined by at least one dimension of the at least one closable opening 110. As referred to in relation to FIGS. 7 and 8, in some examples, the at least one closable opening 110 may have a first dimension in a first direction defined between the support portion 104 and a distal end of the extension portion 106. In some examples, the at least one closable opening 110 may have a second dimension in a second direction defined between a medial edge and lateral edge of the foot support 100. In some examples, the at least one closable opening 110 may have a third dimension in a third direction between the upper side and lower side.

Figure 13:
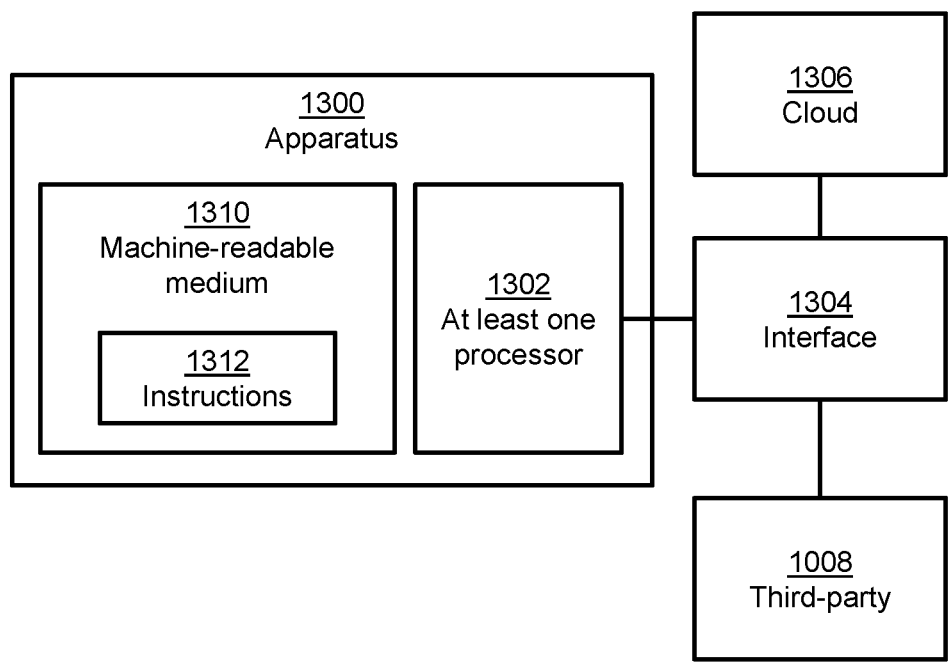
FIG. 13 is a schematic illustration of an example apparatus for implementing or at least partially facilitating certain methods or machine-readable media described herein.

FIG. 13 is a schematic illustration of an example apparatus 1300 for implementing or at least partially facilitating certain methods or machine-readable media described herein. The apparatus 1300 may be implemented by a service provider 910 (as referred to in FIG. 9) or another entity (such as a clinician's or patient's computer (e.g., associated with the client system 902) or a computer associated with the third-party manufacturer 912) authorized to produce the design/object model data of foot supports according to the examples described herein. The apparatus 1300 comprises at least one processor 1302 communicatively coupled to an interface 1304 (e.g., implemented by a communication interface) for sending and/or receiving data to/from the cloud 908 and/or a third-party manufacturer 912 (as referred to in FIG. 9).

The apparatus 1300 further comprises a non-transitory (e.g., 'tangible') machine-readable medium 1310 storing instructions 1312 executable by the at least one processor 1302. The non-transitory machine-readable medium 1310 comprises instructions 1312 to produce/generate a design/digital model/object model data corresponding to a foot support according to any of the examples described herein, whether describing the foot support 100, 200, 300, 400, 500, 700, 800 itself, the method 1100 or the machine-readable medium 1200.

Personalizing Foot Supports

As described above, a subject may be experiencing a certain foot condition such as 'plantar 2nd metatarsal head symptoms', 'structural hallux limitus', 'hallux rigidus', 'functional hallux limitus' etc. A certain type of extension portion 106 (e.g., Morton's extension, reverse Morton's extension and/or partial reverse Morton's extension) with a specified flexibility/rigidity degree may be prescribed to correct or alleviate such conditions.

Examples described herein may personalize the design of a foot support to a subject. In the following examples, reference is made to features of the foot support 100 of FIG. 1 although the examples may be applicable to the generation of any of the foot supports (e.g., foot supports 200, 300, 400, 500, 700, 800) described herein and certain features and functionality of these foot supports may be referenced in the description of the examples.

Figure 14:
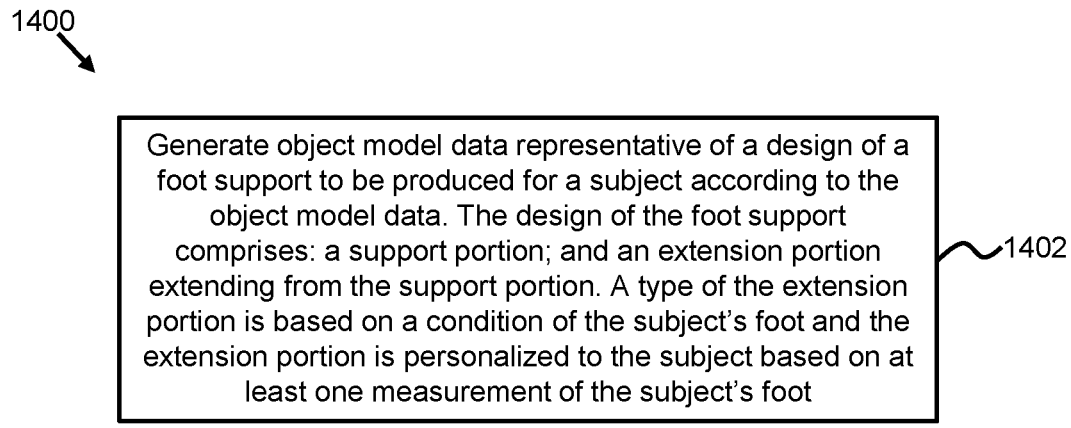
FIG. 14 refers to an example method of generating object model data.

FIG. 14 refers to an example method 1400 of generating object model data such as may be produced/generated by the service provider 910, 1006 of FIGS. 9 and 10 (or such as may be produced/generated by another entity authorized to produce the object model data (for example, an authorized client system 902 or third-party manufacturer 912)). The method 1400 may be implemented by processing circuitry of a user computer, the cloud or a server e.g., controlled by the service provider 910, 1006. For example, the method 1400 may be stored (e.g., in the form of instructions) in a suitable form in the non-transitory (e.g., 'tangible') machine-readable medium for execution of the method 1400 according to the instructions by at least one processor of any of the entities described above.

The method 1400 comprises, at block 1402, generating object model data representative of a design of a foot support 100 to be produced for a subject according to the object model data. The design of the foot support 100 comprises a support portion 104 and an extension portion 106 extending from the support portion 104. A type of the extension portion 106 is based on a condition of the subject's foot. In addition, the extension portion 106 is personalized to the subject based on at least one measurement of the subject's foot.

The shape (e.g., dimensions) of a subject's foot and location of anatomical features of the subject's foot may be unique to each subject. The object model data generated by the method 1400 may be used (e.g., by the apparatus 1000 of FIG. 10) to produce a foot support 100 (e.g., by the additive manufacturing apparatus 1008 of FIG. 10) that is personalized to the subject's foot by virtue of being based on the condition of the subject's foot as well as being personalized to the subject's foot. Thus, the foot support 100 may be personalized to the needs of the subject and their morphology. The ecosystem (e.g., the ecosystem 900 of FIG. 9) for designing and producing the foot support 100 may facilitate automatic generation of a personalized foot support 100 from image data (e.g., from a 3D foot scan) and the prescription (e.g., manually specified by a clinician or by inference from at least one measurement obtained in relation to the subject's foot such as a gait analysis).

In some examples, the foot support 100 may comprise a flexible/rigid/semi-rigid portion formed in the foot support 100 to permit flexing of the foot support 100 within a specified angle range. As described above, in some examples, at least one closable opening 110 provided in the foot support 100 may facilitate the provision of such a flexible/rigid/semi-rigid portion. In some examples, there may be no closable opening 110 present in the foot support. Thus, the method 1400 may facilitate generation of a design with a rigidity/flexibility specified according a subject's foot condition.

In some examples, the foot support 100 is a shell for a foot orthotic insert, where the support portion 104 and extension portion 106 are integral parts of the shell. The shell may be assembled with other components in post-processing i.e., after manufacturing the shell. Manufacturing the support portion 104 and extension portion 106 as integral with each other may reduce the number of components, reduce costs and/or simplify manufacture of such a foot orthotic insert.

Certain manufacturing methods such as 3DP may provide an accurate and/or repeatable way to produce the foot support 100 that is also well suited to personalization. In addition, in some examples, the specified flexibility/rigidity in the foot support 100, which may be enabled by such manufacturing methods, may facilitate correction or alleviation of a variety of foot conditions in an ecosystem which provides a convenient and/or highly personalized service for the subject.

Figure 15:
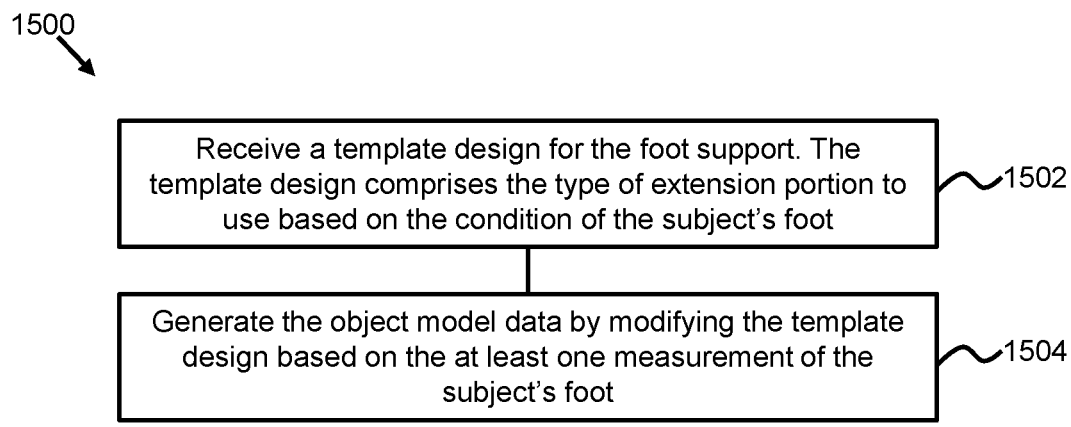
FIG. 15 refers to an example method of generating object model data.

FIG. 15 refers to an example method 1500 of generating object model data that may be implemented in the same or similar way to method 1400 of FIG. 14. In this example, the method 1500 may implement the functionality of block 1402 of the method 1400 as part of or in conjunction with the method 1500.

The method 1500 comprises, at block 1502, receiving a template design for the foot support. The template design comprises the type of extension portion to use based on the condition of the subject's foot. Different 'template designs' may be stored (e.g., in a memory such as a database comprising possible template designs) and be accessible to at least one processor for executing the method 1500. The template design that is accessed may be based on the indicated condition and/or at least one measurement associated with the subject. For example, there may be a template design corresponding to each of the different types of Morton's extension (e.g., 'standard', 'reverse' and 'partial reverse'). In a further example, there may be a template design corresponding to each of a set of possible foot sizes. The number of template designs may depend on the set-up of the ecosystem 900 and/or the range of foot conditions that may be corrected or alleviated under the ecosystem 900.

The method 1500 further comprises, at block 1504, generating the object model data by modifying the template design based on the at least one measurement of the subject's foot. The at least one measurement may refer to at least one dimension and/or the location of at least anatomical feature of the subject's foot. The template design may be modified such that it is appropriately sized and/or shaped to be personalized to the subject's foot.

Figure 16:
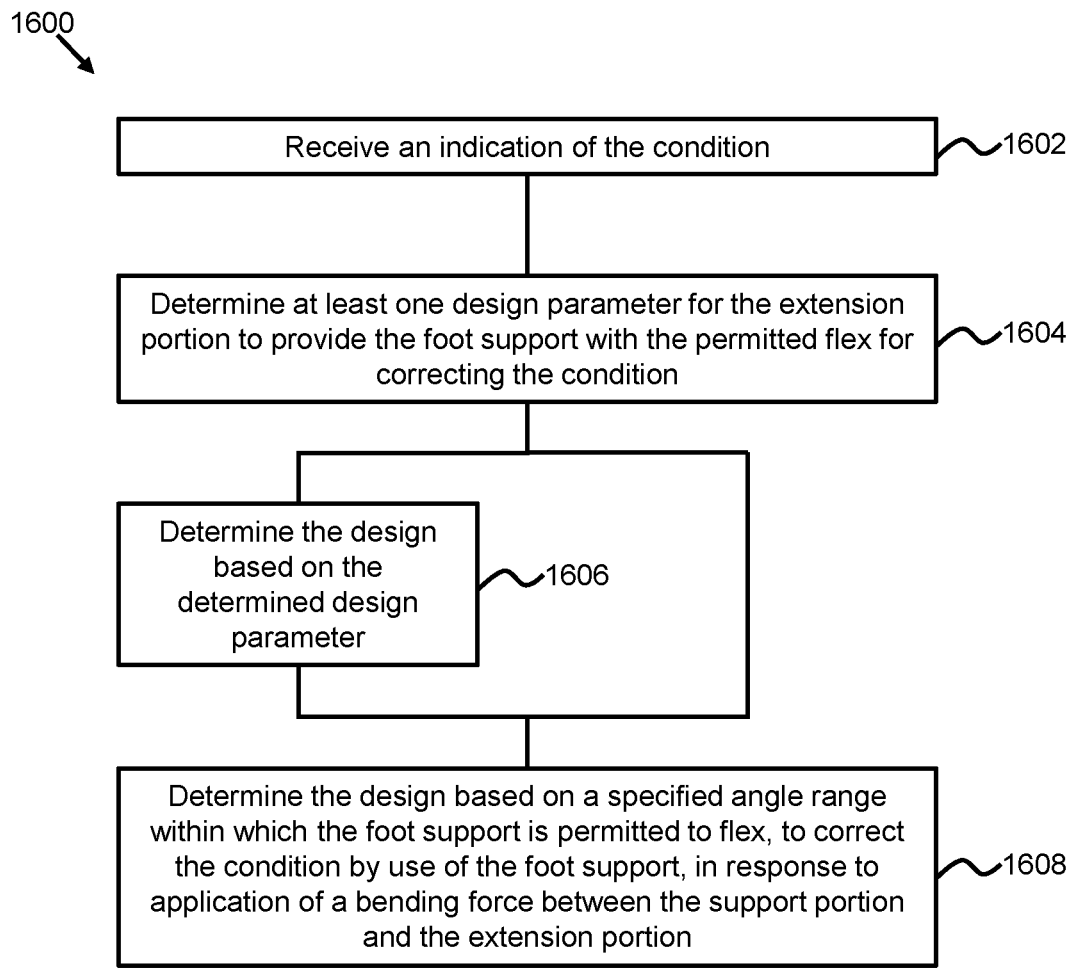
FIG. 16 refers to an example method of determining a design for a foot support.

FIG. 16 refers to an example method 1600 of determining a design for the foot support 100 that may be implemented in the same or similar way to method 1400 of FIG. 14. In this example, the method 1600 may implement the functionality of block 1402 of the method 1400 as part of or in conjunction with the method 1600. Certain blocks corresponding to certain examples of the method 1600 may be omitted.

The method 1600 comprises, at block 1602, receiving an indication of the condition. In some examples, the indication comprises a name or a reference to the (foot) condition. In some examples, the indication comprises a 'specified angle range' within which the foot support 100 is permitted to flex (e.g., where the foot support 100 is to become rigid if the foot support 100 is flexed beyond the specified angle range). For example, the specified angle range may be indicative of the condition that is to be corrected or alleviated.

In some examples, the method 1600 comprises, at block 1604, determining at least one design parameter for the extension portion 106 to provide the foot support 100 with the permitted flex for correcting the condition. The design parameter may comprise at least one dimension, a number, a position and/or a presence of at least one closable opening 110 formed in the foot support 100 such that, upon flexing of the foot support 100 by application of the bending force between the support portion 104 and the extension portion 106 (through use of the foot support 100), closure of the at least one opening 110 is to prevent further flexing of the foot support 100 beyond the specified angle range.

The at least one dimension may refer to any of the dimensions described in relation to FIGS. 7 and 8 and/or any other dimension relating to the shape/size (e.g., width, length, thickness and/or contour) of the extension portion 106. The number and/or position of the closable opening(s) 110 may affect the flexibility/rigidity characteristics of the extension portion 106. In some examples, there may not be any closable openings 110 present (thus, the design parameter may specify such a design).

In some examples, the method 1600 comprises, at block 1606, determining the design based on the determined at least one design parameter. For example, the design may be determined (e.g., personalized to the subject) by determining the at least one design parameter that may be suitable for correcting or alleviating the condition. As depicted by FIG. 16, in some examples, block 1606 may be omitted as part of the method 1600.

The method 1600 further comprises, at block 1608, determining the design based on a specified angle range within which the foot support 100 is permitted to flex, to correct the condition by use of the foot support 100, in response to application of a bending force between the support portion 104 and the extension portion 106. Block 1608 may refer to the process of designing the foot support 100 to have the specified flexibility/rigidity property for the condition that the foot support 100 is design to correct or alleviate in accordance with the needs of the subject. For example, certain factors may be taken into account based on the needs of the subject. In an example, different subjects may apply differing levels of bending force when they bend their foot (e.g., due to their age, size, gait, etc.). Accordingly, the flexibility/rigidity/specified angle range, etc., of the foot support 100 may be appropriately specified based on the expected bending force that the foot support 100 may experience. In other words, the design may therefore be determined based on at least one of such factors.

Figure 17:
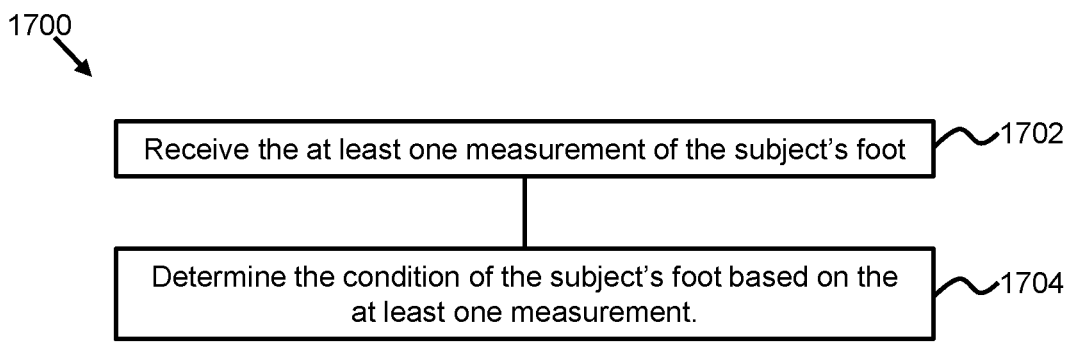
FIG. 17 refers to an example method of determining a condition of a subject's foot.

FIG. 17 refers to an example method 1700 of determining a condition of a subject's foot that may be implemented in the same or similar way to method 1400 of FIG. 14. In this example, the method 1700 may implement the functionality of block 1402 of the method 1400 as part of or in conjunction with the method 1700.

The method 1700 comprises, at block 1702, receiving the at least one measurement of the subject's foot. For example, a client system 902 as shown by FIG. 9 may be used to obtain the at least one measurement, which may be sent to either the cloud 908 for receipt by the service provider 910 to implement the method 1700, the third-party manufacturer 912 to implement the method 1700 or another entity to implement the method 1700. The client system 902 may comprise or have access to at least one type of measurement system. In some examples, the measurement system comprises an image acquisition system (e.g., a camera) or other scanner to obtain the geometry of the subject's foot. In some examples, the measurement system comprises a pressure pad system, or another appropriate system, to analyze the subject's gait. Thus, measurements may be obtained by one or both of these example measurement systems.

In some examples, the at least one measurement is indicative of a geometry of the subject's foot. In some examples, the geometry may refer to the shape, size and/or location of at least one anatomical feature of the subject's foot.

In some examples, the at least one measurement comprises pressure data obtained by a gait analysis of the subject's foot. For example, a gait analysis may be performed by measuring the pressure applied by different parts of the foot while the subject walks/runs across a pressure pad (not shown) such that the pressure applied at different phases of the subject's gait is recorded.

The method 1700 further comprises, at block 1704, determining the condition of the subject's foot based on the at least one measurement. For example, the gait analysis may provide data which can be used to determine the foot condition. By way of example, by examining the pressure applied by different parts of the foot at different phases of the subject's gait, it may be possible to recognize which condition is relevant to the subject. Such recognition may be evaluated manually by a clinician and/or may be recognized automatically via the gait analysis system.

Figure 18:
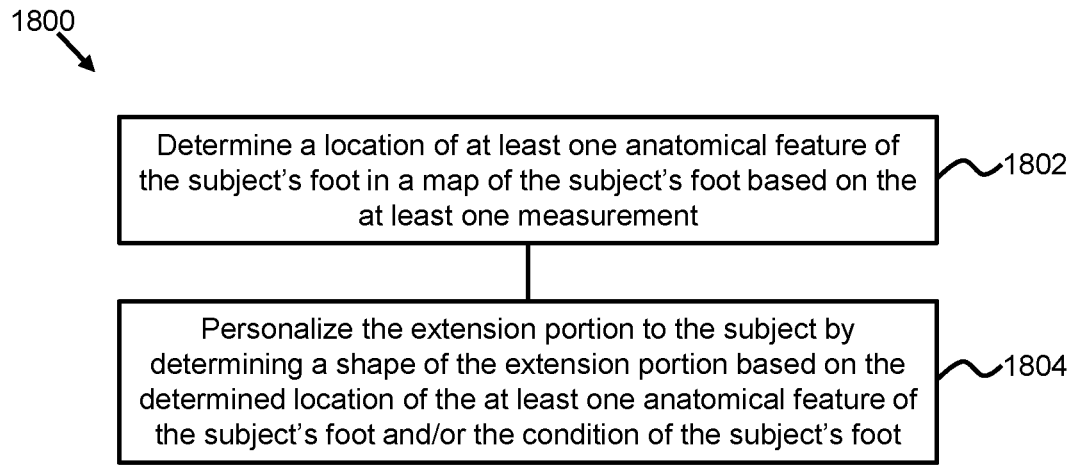
FIG. 18 refers to an example method of personalizing a foot support.

FIG. 18 refers to an example method 1800 of personalizing the foot support 100 that may be implemented in the same or similar way to method 1400 of FIG. 14. In this example, the method 1800 may implement the functionality of block 1402 of the method 1400 as part of or in conjunction with the method 1800.

The method 1800 comprises, at block 1802, determining a location of at least one anatomical feature of the subject's foot in a map of the subject's foot based on the at least one measurement.

In some examples, the map may comprise a two-dimensional plan of a contour of the subject's foot (e.g., where an underside of the subject's foot contacts a surface for supporting the subject). The location of the at least one anatomical feature may be determined from the at least one measurement and referenced to a corresponding location on the map.

For example, as mentioned above, gait analysis may collect data about how different parts of the foot interact with a pressure pad. Thus, in some examples, the pressure pad may record spatial location information regarding different parts (anatomical features) of the foot, which may be referenced to the map.

In some examples, at least one image of the foot may be obtained (e.g., by a camera) and machine-vision techniques may be used to identify different parts (anatomical features) of the foot from the at least one image. A map may be created or defined, which may be used to mark the location(s) of the at least one anatomical feature within the map.

The method 1800 further comprises, at block 1804, personalizing the extension portion 106 to the subject by determining a shape of the extension portion 106 based on the determined location of the at least one anatomical feature of the subject's foot and/or the condition of the subject's foot.

The location of at least one anatomical feature may be used to define the shape (which may include the size and/or relative positions) of different parts of the foot support 100. For example, the shape of the extension portion 106 relative to the support portion 104 may depend on the determined location. In some examples, the shape of the extension portion 106 may depend on the location of at least one metatarsophalangeal joint (MPJ) in the map (or, in other words, relative to the location of at least one other anatomical feature such as the heel, the arch and/or another MPJ). In addition, the position of the extension portion 106 may depend on its type (which depends on the condition that is to be corrected or alleviated).

In some examples, the shape of the extension portion 106 is defined by a length of the extension portion in a first direction defined between the support portion 104 and a distal end (see line 426 in FIG. 4) of the extension portion 106.

In some examples, the shape of the extension portion 106 is defined by a width of the extension portion 106 in a second direction defined between a medial edge and lateral edge of the foot support 100 (e.g., see lines 420 and 428 of FIG. 4).

In some examples, the shape of the extension portion 106 is defined by a thickness of the extension portion 106 in a third direction between an upper side and lower side (see FIGS. 7 and 8) of the extension portion 106.

In some examples, the shape of the extension portion 106 is defined by whether at least one closable opening 110 is formed in the extension portion 106. In use of the foot support 100, the at least one closable opening 110 is to permit flexing of the foot support 100, within a specified angle range, in response to application of a bending force between the support portion 104 and the extension portion 106.

In some examples, the at least one anatomical feature comprises: at least one metatarsophalangeal joint (MPJ) of the subject's foot, a heel landmark and/or foot arch landmark. Any other appropriate landmark of the foot may be used e.g., to define relative locations of other landmarks of the foot. Thus, in some examples, the shape of the extension portion 106 may be based on the location of at least one MPJ of the subject's foot such as the first MPJ (e.g., for a Morton's extension), a second and fifth MPJ (for a reverse Morton's extension) or a second and fourth MPJ or another selection from the first to fifth MPJs (e.g., for a partial reverse Morton's extension). In some examples, the locations of the MPJs may be determined automatically (e.g., based on at least one image of the subject's foot such as provided by pressure data and/or a machine-vision technique) or may be determined manually by a clinician. In some examples, the clinician may evaluate the results of the automatic system e.g., to fine-tune the results.

Figure 19:
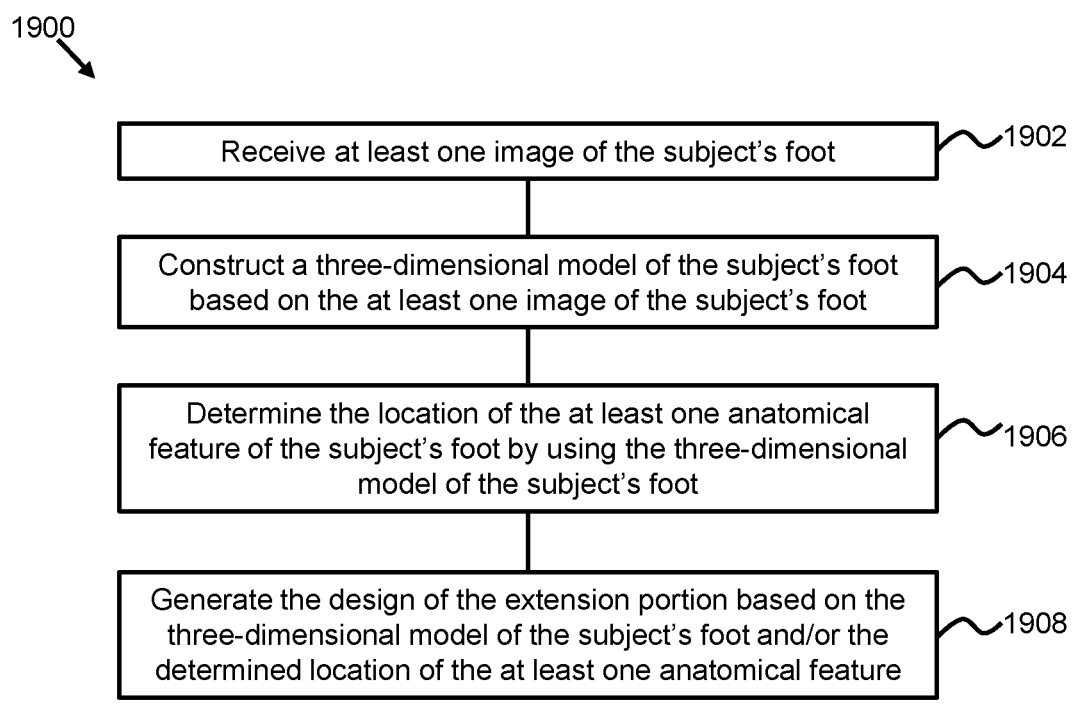
FIG. 19 refers to an example method of generating a design for a foot support.

FIG. 19 refers to an example method 1900 of generating a design for the foot support 100 that may be implemented in the same or similar way to method 1400 of FIG. 14. In this example, the method 1900 may implement the functionality of block 1402 of the method 1400 as part of or in conjunction with the method 1900. Certain blocks corresponding to certain examples of the method 1900 may be omitted.

In some examples, the method 1900 comprises, at block 1902, receiving at least one image (e.g., acquired by a camera, scanner, etc.) of the subject's foot.

In some examples, the method 1900 comprises, at block 1904, constructing a three-dimensional model of the subject's foot based on the at least one image of the subject's foot. In some examples, the three-dimensional model may be constructed by projecting features from at least one image (e.g., including a single image) onto the three-dimensional model based on a reconstruction model of subject's foot. In some examples, the at least one image may be taken at different angles to assist in the projection of the features onto the three-dimensional model.

In some examples, the method 1900 comprises, at block 1906, determining the location of the at least one anatomical feature of the subject's foot by using the three-dimensional model of the subject's foot (e.g., obtained at block 1904 or determined previously and accessible from storage). As mentioned previously, the location of the at least one anatomical feature may be recognized and referenced in the map or, in this case, projected onto the three-dimensional model.

In some examples, the method 1900 comprises, at block 1908, generating the design of the extension portion 106 based on the three-dimensional model of the subject's foot and/or the determined location of the at least one anatomical feature. For example, once the three-dimensional model of the subject's foot and/or location(s) of the at least one anatomical feature has been determined, the geometry of the subject's foot (and the respective location of the at least one anatomical feature within the geometry) is used to generate the design in such a way that is personalized to the subject's foot geometry.

Figure 20:
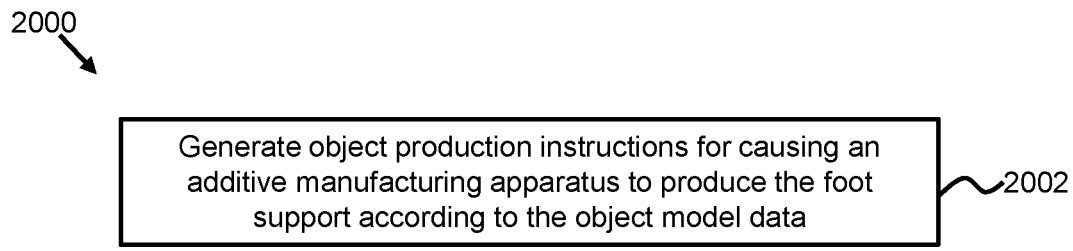
FIG. 20 refers to an example method of generating object production instructions.

FIG. 20 refers to an example method 2000 of generating object production instructions (e.g., 'print instructions' for the additive manufacturing apparatus 1008 of FIG. 10) for the foot support 100. The method 2000 may be implemented in the same or similar way to method 1400 of FIG. 14 or may be implemented by an apparatus 1000 such as shown by FIG. 10. In this example, the method 2000 may implement the functionality of block 1402 of the method 1400 as part of or in conjunction with the method 2000. However, in some examples, the method 2000 may be independent of the method 1400.

The method 2000 comprises, at block 2002, generating object production instructions for causing the additive manufacturing apparatus 1008 to produce the foot support 100 according to the object model data.

Figure 21:
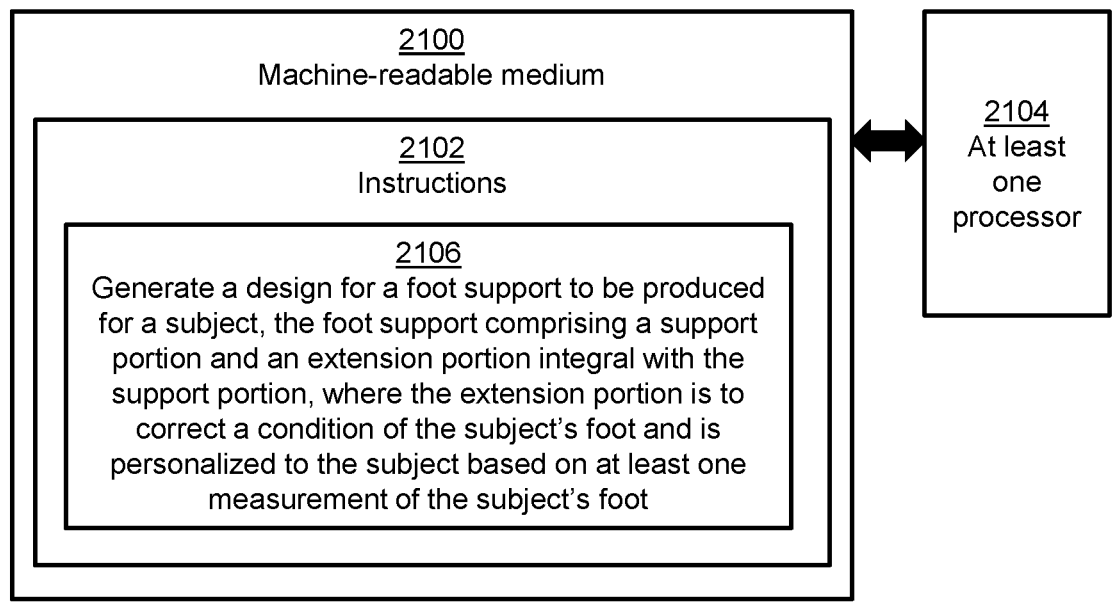
FIG. 21 is a schematic illustration of an example non-transitory machine-readable medium associated with generating a design for a foot support.

FIG. 21 shows an example non-transitory (e.g., 'tangible') machine-readable medium 2100 storing instructions 2102 executable by at least one processor 2104. The non-transitory machine-readable medium 2100 may be implemented by the any of the entities referred to in relation to the method 1100 of FIG. 11 (e.g., the service provider 910, 1006 of FIGS. 9 and 10 or another entity authorized to produce the design/object model data (for example, an authorized client system 902 or third-party manufacturer 912)).

The instructions 2102 comprise instructions 2106 to cause the at least one processor 2104 to generate a design for a foot support 100 to be produced for a subject. The foot support 100 comprises a support portion 104 and an extension portion 106 integral with the support portion 104. The extension portion 106 is to correct a condition of the subject's foot and is personalized to the subject based on at least one measurement of the subject's foot.

Figure 22:
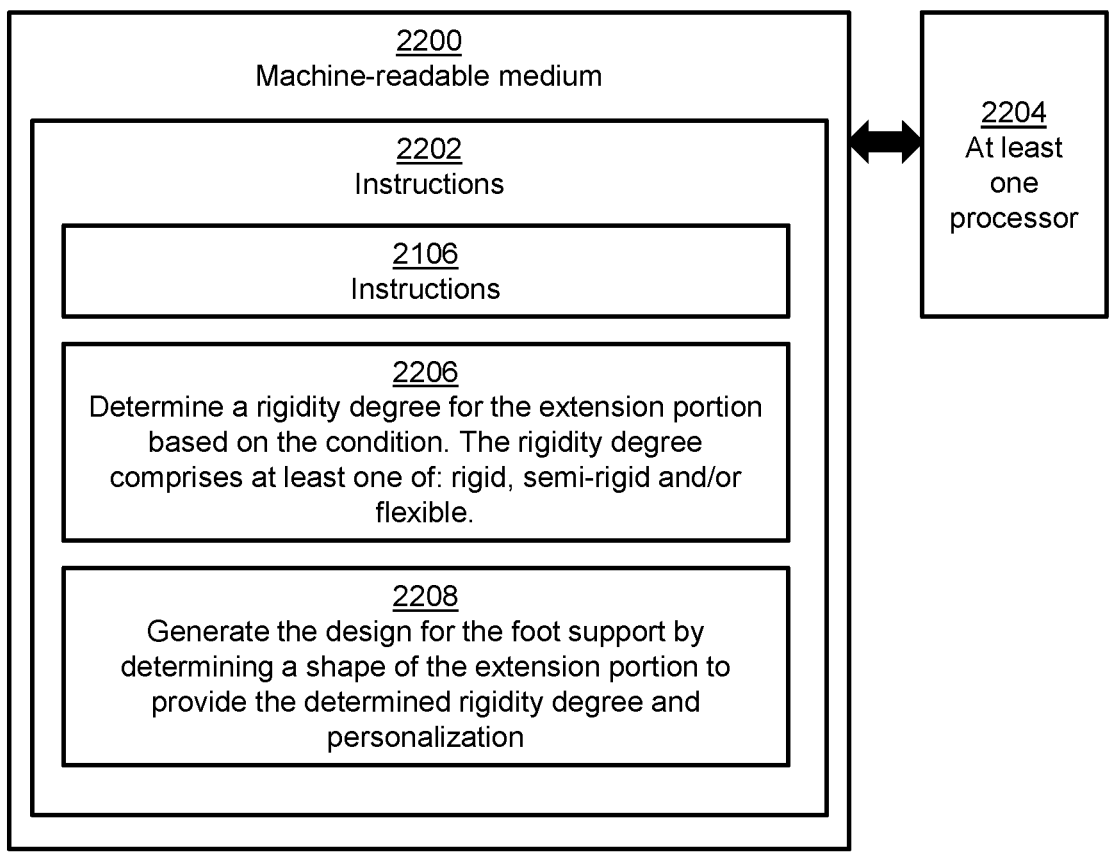
FIG. 22 is a schematic illustration of an example non-transitory machine-readable medium associated with generating a design for a foot support.

FIG. 22 shows an example non-transitory (e.g., 'tangible') machine-readable medium 2200 storing instructions 2202 executable by at least one processor 2204. The non-transitory machine-readable medium 2200 may be implemented by the any of the entities referred to in relation to the method 1100 of FIG. 11 (e.g., the service provider 910, 1006 of FIGS. 9 and 10 or another entity authorized to produce the design/object model data (for example, an authorized client system 902 or third-party manufacturer 912)). Thus, the medium 2200 may be implemented in the same or similar way to the method 1100. In this example, the medium 2200 stores the instructions 2106. Certain instructions referred to below may be omitted or performed in a different order to that depicted by FIG. 22.

In some examples, the medium 2200 further comprises instructions 2206 to cause the at least one processor 2204 to determine a rigidity degree (as referred to in relation to FIG. 12) for the extension portion 106 based on the condition. The rigidity degree comprises at least one of: rigid, semi-rigid and/or flexible.

In some examples, the medium 2200 further comprises instructions 2208 to cause the at least one processor 2204 to generate the design for the foot support 100 by determining a shape of the extension portion 106 to provide the determined rigidity degree and personalization. In this example, the 'shape' may refer to the size and/or shape of the extension portion 106 as well as whether or not at least one opening 110 is to be provided in the extension portion 106 (including the number, type and/or distribution of the at least one opening 110).

In some examples, the shape of the extension portion 106 is to permit flexing of the foot support 100 within a specified angle range in response to application of a bending force. The specified angle range associated with the semi-rigid extension portion 106 may be greater than the specified angle range associated with the rigid extension portion 106. The specified angle range associated with the flexible extension portion 106 may be greater than the specified angle range associated with the semi-rigid extension portion 106. In other words, by varying the 'shape' of the extension portion 106 (e.g., by varying at least one design parameter), the flexibility/rigidity of the extension portion 106 may be varied accordingly although the flexibility/rigidity may depend on the angle between the support portion 104 and the extension portion 106.

In some examples, the shape of the extension portion 106 is personalized to the subject's foot based on a location of at least one anatomical feature determined from the measurement of the subject's foot. For example, the geometry of the subject's foot may be taken into account when personalizing the foot support 100.

Various examples of the foot supports 100, 200, 300, 400, 500, 700, 800 are depicted by FIGS. 1 to 5 and 7 to 8. Reference is again made to the foot support 100 of FIG. 1 in the following examples, however, the other foot supports 200, 300, 400, 500, 700, 800 may also be relevant to the following examples.

According to some examples, a foot support 100 comprises a support portion 104. The foot support 100 further comprises an extension portion 106 integral with the support portion 104. The extension portion 106 is to correct a condition of the subject's foot. The extension portion 106 is designed based on at least one measurement of the subject's foot.

In some examples, the extension portion 106 comprises a Morton's extension, a reverse Morton's extension and/or a partial reverse Morton's extension.

In some examples, the foot support 100 is produced by additive manufacturing.

Any combination of these examples may be implemented by a method, machine-readable medium and/or apparatus such as described elsewhere in this disclosure.

Any of the blocks, nodes, instructions or modules described in relation to the figures may be combined with, implement the functionality of or replace any of the blocks, nodes, instructions or modules described in relation to any other of the figures. For example, methods may be implemented as machine-readable media or apparatus, machine-readable media may be implemented as methods or apparatus, and apparatus may be implemented as machine-readable media or methods. Further, any of the functionality described in relation to any one of a method, machine readable medium or apparatus described herein may be implemented in any other one of the method, machine readable medium or apparatus described herein. Any claims written in single dependent form may be re-written, where appropriate, in multiple dependency form since the various examples described herein may be combined with each other.

Examples in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus, functional nodes, modules or apparatus of the system and other devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving, by processing circuitry, a template design for a foot support to be produced for a subject, wherein
the foot support comprises a support portion and an extension portion extending from the support portion, where a type of the extension portion is based on a condition of the subject's foot and the extension portion is personalized to the subject based on at least one measurement of the subject's foot, and
the template design comprises the type of extension portion to use based on the condition of the subject's foot;
generating, by the processing circuitry, object model data representative of a design of the foot support by modifying the template design based on the at least one measurement of the subject's foot, the foot support to be produced according to the object model data, wherein generating the object model data comprises:
receiving user input of a numerical rigidity parameter value of a rigidity degree of the foot support, or user selection one rigidity degree from a list of different rigidity degrees comprising rigid, semi-rigid, and rigid rigidity degrees;
receiving a design parameter specifying that one or more closable openings are to be formed at an upper side of the foot support or that the one or more closable openings is to be formed at the upper side of the foot support;
modifying the template design so that the foot support has the rigidity degree per the user input of the numerical rigidity parameter value or per the user selection of the one rigidity degree from the list;
modifying the template design so that the foot support has the one or more closable openings specified by the design parameter; and
causing, by the processing circuitry, an additive manufacturing apparatus to produce the foot support according to the generated object model data to produce the food support per the template design.

2. The method of claim 1, further comprising:
receiving the at least one measurement of the subject's foot, where the at least one measurement:
is indicative of a geometry of the subject's foot; and/or
comprises pressure data obtained by a gait analysis of the subject's foot; and
determining the condition of the subject's foot based on the at least one measurement.

3. The method of claim 1, further comprising:
determining a location of at least one anatomical feature of the subject's foot in a map of the subject's foot based on the at least one measurement; and
personalizing the extension portion to the subject by determining a shape of the extension portion based on the determined location of the at least one anatomical feature of the subject's foot and/or the condition of the subject's foot.

4. The method of claim 3, wherein the shape of the extension portion is defined by:
a length of the extension portion in a first direction defined between the support portion and a distal end of the extension portion;
a width of the extension portion in a second direction defined between a medial edge and lateral edge of the foot support; and/or
a thickness of the extension portion in a third direction between an upper side and a lower side of the extension portion.

5. The method of claim 3, wherein the shape of the extension portion is defined by the one or more closable openings are formed in the extension portion, and
wherein the one or more closable openings permit flexing of the foot support within a specified angle range, in response to application of a bending force between the support portion and the extension portion.

6. The method of claim 3, further comprising determining the shape of the extension portion based on the location of at least one metatarsophalangeal joint (MPJ) of the subject's foot.

7. The method of claim 1, wherein generating the object model data further comprises determining a number, type, and/or distribution of the one or more closable openings based on the rigidity degree per the user input of the numerical rigidity parameter value or per the user selection of the one rigidity degree from the list,
and wherein modifying the template design so that the foot support has the one or more closable openings specified by the design parameter comprises modifying the template design so that the foot support has the number, type, and/or degree of one or more closable openings.

8. The method of claim 7, wherein generating the object model data further comprises determining the type of the one or more closable openings in accordance with a dimension of the one or more closable openings.

9. The method of claim 8, wherein the dimension of the one or more closable openings comprises a first dimension in a first direction between the foot support and a distal end of the extension portion.

10. The method of claim 9, wherein the dimension of the one or more closable openings comprises a second dimension in a second direction between a medial edge and a lateral edge of the foot support.

11. The method of claim 10, wherein the dimension of the one or more closable openings comprises a third dimension in a third direction between the upper side of the foot support and a lower side of the foot support.

12. A non-transitory machine-readable medium storing instructions executable by at least one processor to perform processing comprising:
receiving a template design for a foot support to be produced for a subject, wherein
the foot support comprises a support portion and an extension portion extending from the support portion, where a type of the extension portion is based on a condition of the subject's foot and the extension portion is personalized to the subject based on at least one measurement of the subject's foot, and
the template design comprises the type of extension portion to use based on the condition of the subject's foot;
generating object model data representative of a design of the foot support by modifying the template design based on the at least one measurement of the subject's foot, the foot support to be produced according to the object model data, wherein generating the object model data comprises:
receiving user input of a numerical rigidity parameter value of a rigidity degree of the foot support, or user selection one rigidity degree from a list of different rigidity degrees comprising rigid, semi-rigid, and rigid rigidity degrees;
receiving a design parameter specifying that one or more closable openings are to be formed at an upper side of the foot support or that the one or more closable openings is to be formed at the upper side of the foot support;
modifying the template design so that the foot support has the rigidity degree per the user input of the numerical rigidity parameter value or per the user selection of the one rigidity degree from the list;
modifying the template design so that the foot support has the one or more closable openings specified by the design parameter; and
causing an additive manufacturing apparatus to produce the foot support according to the generated object model data to produce the food support per the template design.

13. The non-transitory machine-readable medium of claim 12, wherein the processing further comprises:
receiving the at least one measurement of the subject's foot, where the at least one measurement:
is indicative of a geometry of the subject's foot; and/or
comprises pressure data obtained by a gait analysis of the subject's foot; and
determining the condition of the subject's foot based on the at least one measurement.

14. The non-transitory machine-readable medium of claim 12, wherein the processing further comprises:
determining a location of at least one anatomical feature of the subject's foot in a map of the subject's foot based on the at least one measurement; and
personalizing the extension portion to the subject by determining a shape of the extension portion based on the determined location of the at least one anatomical feature of the subject's foot and/or the condition of the subject's foot.

15. The non-transitory machine-readable medium of claim 14, wherein the shape of the extension portion is defined by:
a length of the extension portion in a first direction defined between the support portion and a distal end of the extension portion;
a width of the extension portion in a second direction defined between a medial edge and lateral edge of the foot support; and/or
a thickness of the extension portion in a third direction between an upper side and a lower side of the extension portion.

16. The non-transitory machine-readable medium of claim 14, wherein the shape of the extension portion is defined by whether at least the one or more closable openings are formed in the extension portion, and
wherein the at least one or more closable openings is to permit flexing of the foot support within a specified angle range, in response to application of a bending force between the support portion and the extension portion.

17. The non-transitory machine-readable medium of claim 14, wherein the processing further comprises determining the shape of the extension portion based on the location of at least one metatarsophalangeal joint (MPJ) of the subject's foot.

18. The non-transitory machine-readable medium of claim 12, wherein generating the object model data further comprises determining a number, type, and/or distribution of the one or more closable openings based on the rigidity degree per the user input of the numerical rigidity parameter value or per the user selection of the one rigidity degree from the list, and wherein modifying the template design so that the foot support has the one or more closable openings specified by the design parameter comprises modifying the template design so that the foot support has the number, type, and/or degree of one or more closable openings.

19. The non-transitory machine-readable medium of claim 18, wherein generating the object model data further comprises determining the type of the one or more closable openings in accordance with a dimension of the one or more closable openings.

20. The non-transitory machine-readable medium of claim 19, wherein the dimension of the one or more closable openings comprises:
- a first dimension in a first direction between the foot support and a distal end of the extension portion;
- a second dimension in a second direction between a medial edge and a lateral edge of the foot support; and
- a third direction between the upper side of the foot support and a lower side of the foot support.

* * * * *